(12) United States Patent
Yamaoka

(10) Patent No.: US 8,886,458 B2
(45) Date of Patent: Nov. 11, 2014

(54) NEIGHBORHOOD CREATING DEVICE, NEIGHBORHOOD CREATING METHOD, AND COMPUTER-READABLE RECORDING MEDIUM STORING PROGRAM

(71) Applicant: Fujitsu Limited, Kawasaki (JP)

(72) Inventor: Hisatoshi Yamaoka, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 3 days.

(21) Appl. No.: 13/779,799

(22) Filed: Feb. 28, 2013

(65) Prior Publication Data

US 2013/0325327 A1 Dec. 5, 2013

(30) Foreign Application Priority Data

May 29, 2012 (JP) .................................. 2012-121552

(51) Int. Cl.
*G01S 3/02* (2006.01)
*G01C 21/20* (2006.01)

(52) U.S. Cl.
CPC .................................... *G01C 21/206* (2013.01)
USPC ........................... 701/445; 342/453; 342/463

(58) Field of Classification Search
None
See application file for complete search history.

(56) References Cited

U.S. PATENT DOCUMENTS 6,118,888 A 9/2000 Chino et al.
6,674,403 B2 * 1/2004 Gray et al. .................... 342/463

FOREIGN PATENT DOCUMENTS

| JP | 10-301675 | 11/1998 |
|---|---|---|
| JP | 2002-157666 | 5/2002 |
| JP | 2003-61924 | 3/2003 |
| JP | 2004-78304 | 3/2004 |
| JP | 2007-248472 | 9/2007 |
| JP | 2011-193377 | 9/2011 |
| JP | 2011-248802 | 12/2011 |

* cited by examiner

*Primary Examiner* — Thomas Tarcza
*Assistant Examiner* — Garrett Evans
(74) *Attorney, Agent, or Firm* — Staas & Halsey LLP

(57) ABSTRACT

A neighborhood creating device includes: a memory; and one or more processors that execute a procedure in the memory, the procedure including a position acquiring process that acquires position information representing a position of a mobile object; a data creating process that creates mobile object data representing a condition associated with a movable range of the mobile object based on the position information; a data acquiring process that acquires obstacle data representing a condition associated with a place through which the mobile object is not able to move; and an information creating process that creates neighborhood information satisfying both conditions represented by the mobile object data and the obstacle data and continuously representing a movable range of the mobile object around the mobile object.

14 Claims, 30 Drawing Sheets

Xi: SAMPLE POINT
Yi: CHARGE POINT

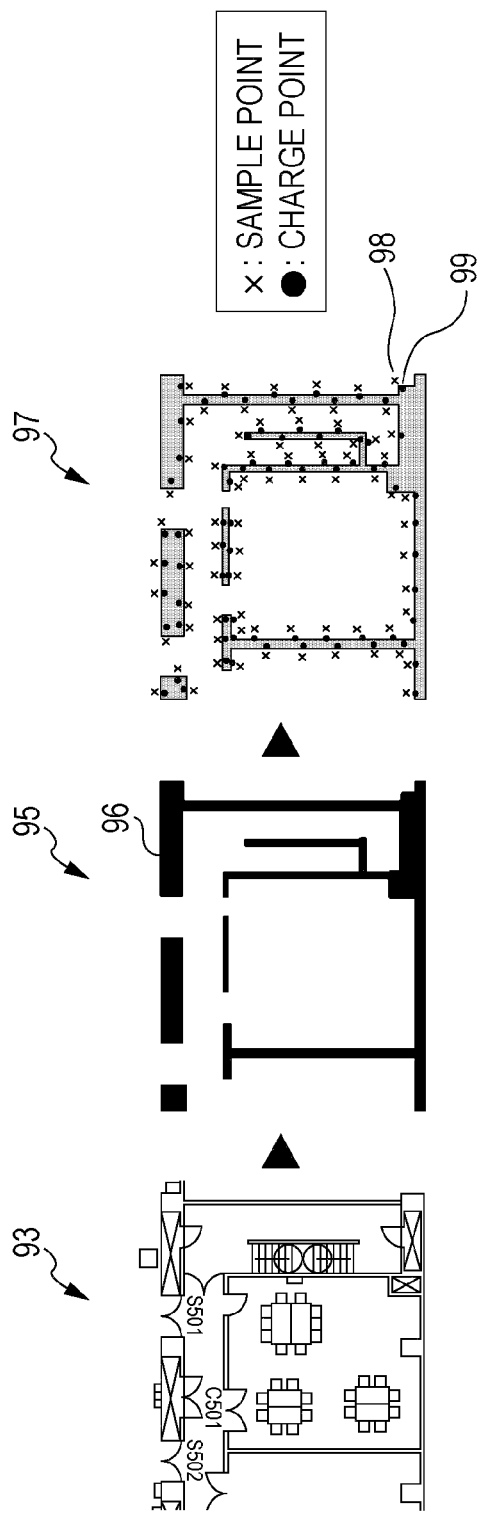

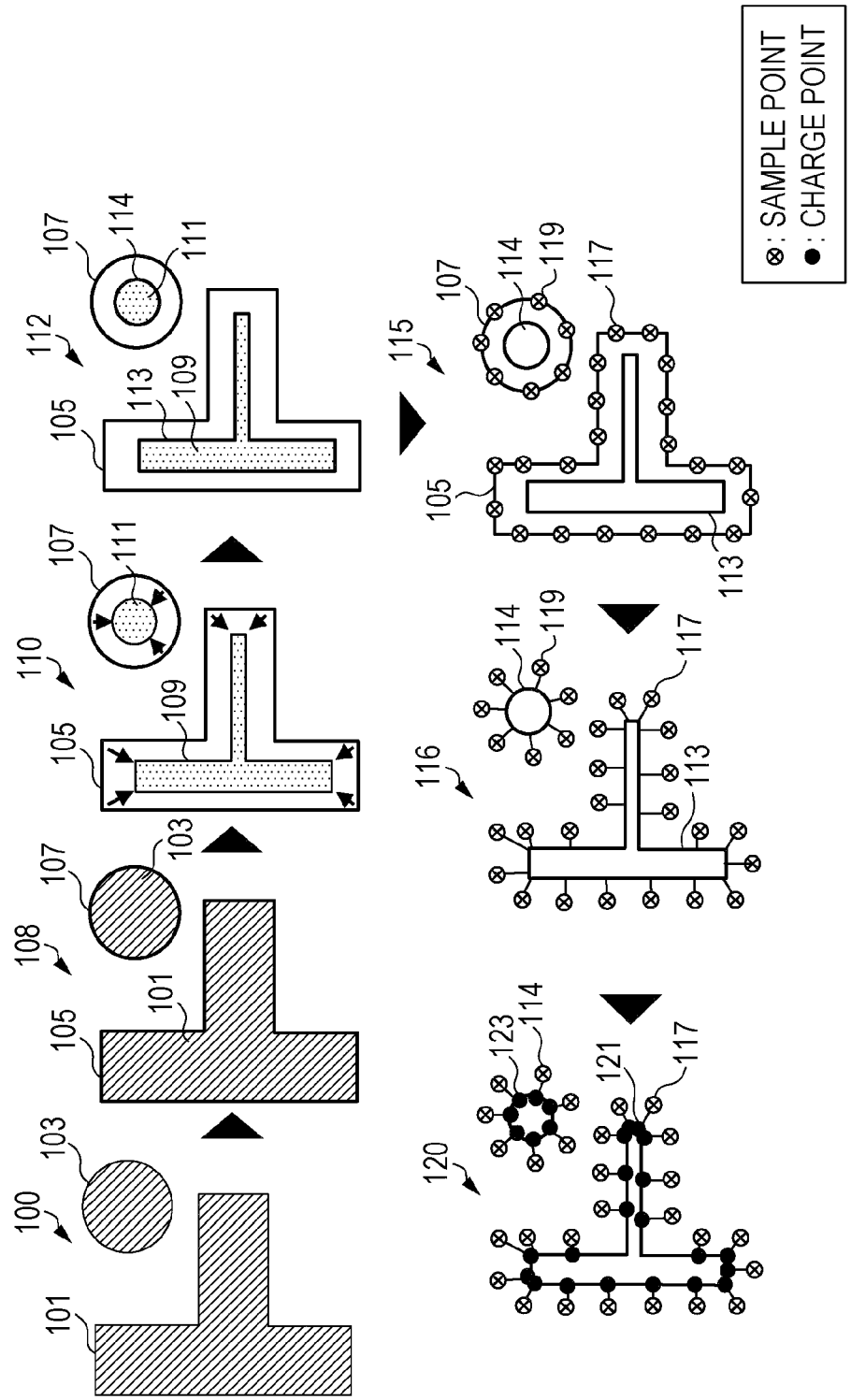

FIG. 15

| TIME STAMP | MOBILE OBJECT ID | MOBILE OBJECT POSITION |
|---|---|---|
| 4.27.2012 17:14:32 | 001 | X = 12.380  Y = 45.173 |
| 4.27.2012 17:14:32 | 001 | X = 12.381  Y = 45.174 |
| 4.27.2012 17:14:33 | 001 | X = 12.381  Y = 45.175 |
| 4.27.2012 17:14:33 | 001 | X = 12.380  Y = 45.176 |
| ⋮ | ⋮ | ⋮ |

FIG. 16

| ID | X COORDINATE | Y COORDINATE |
|---|---|---|
| 001 | 24 | 18 |
| 002 | 34 | 18 |
| 003 | 44 | 18 |
| 004 | 54 | 18 |
| 005 | 64 | 18 |
| 006 | 74 | 18 |

FIG. 17

| MOBILE OBJECT ID | X COORDINATE | Y COORDINATE | POTENTIAL |
|---|---|---|---|
| 101 | 10 | 15 | 0.05 |
| 101 | 15 | 15 | 0.05 |
| 101 | 20 | 15 | 0.06 |
| 101 | 25 | 15 | 0.07 |
| 101 | 30 | 15 | 0.07 |
| 101 | 35 | 15 | 0.06 |
| 101 | 40 | 15 | 0.05 |
| 102 | 30 | 10 | 0.10 |
| ⋮ | ⋮ | ⋮ | ⋮ |

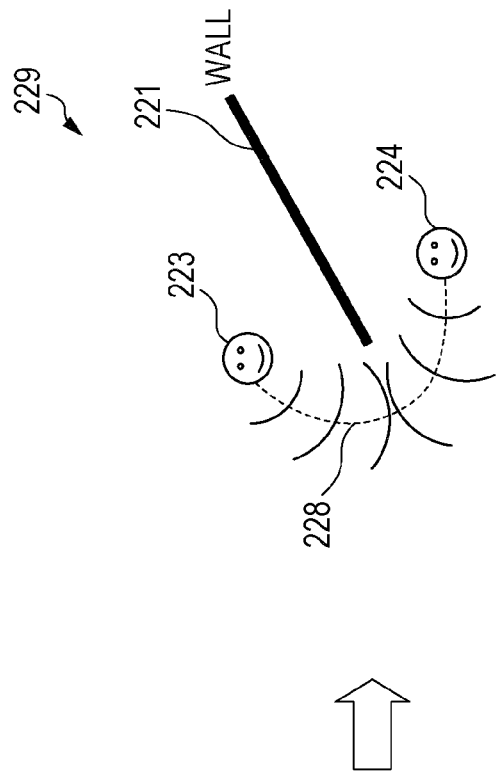
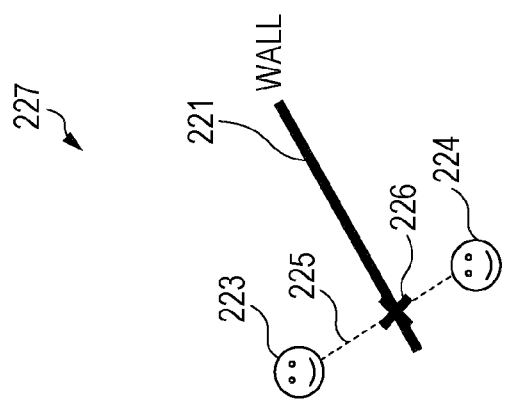
FIG. 25

FIG. 29

| NUMBER OF MOBILE OBJECTS | PREDICTED PROCESS TIME (ms) |
|---|---|
| 20 | 922 |
| 30 | 1356 |
| 40 | 1790 |
| 50 | 2223 |
| 60 | 2657 |
| 70 | 3090 |
| 80 | 3524 |
| 90 | 3958 |
| 100 | 4391 |

NEIGHBORHOOD CREATING DEVICE, NEIGHBORHOOD CREATING METHOD, AND COMPUTER-READABLE RECORDING MEDIUM STORING PROGRAM

CROSS-REFERENCE TO RELATED APPLICATION

This application is based upon and claims the benefit of priority of the prior Japanese Patent Application No. 2012-121552 filed on May 29, 2012, the entire contents of which are incorporated herein by reference.

FIELD

The embodiments discussed herein are related to a neighborhood creating device, a neighborhood creating method, and a computer-readable recording medium storing a program.

BACKGROUND

These days, services of displaying an indoor map on a mobile portable terminal and displaying a route from a present location to a desired location thereon have been suggested. For example, by installing a predetermined application, the present position can be displayed on a map of station premises displayed on a display unit of a mobile portable terminal and a route to a destination such as a toilet can be displayed thereon.

Techniques of calculating a distance between two points in consideration of a route through the use of a route network are also known. For example, a route search in consideration of gateways of facilities can be realized. In this case, a route search can be carried out in which a facility is provided with nodes and links in addition to normal nodes and links and gateways for connecting the inside and the outside of the facility are provided with nodes. Accordingly, in a route search in which a start point is outside the facility and a destination is inside the facility, it is possible to search for a route passing through the optimal gateway by seamlessly using the nodes and links.

In an inquiry method about a space, such as "feeds back an object within a range (target area) of a predetermined distance from a certain spot", techniques of making an inquiry by designating a target area by the use of simple geometric shapes such as circles, rectangles, and polygons are known. These techniques are directed to, for example, analysis of land prices or criminal occurrence situations in a city. Accordingly, since the scale of a map to be used is relatively wide (at a block level) and the error of a global positioning system (GPS) is large, no particular problem occurs in the above-mentioned designation of a target area using the simple geometric shapes.

For example, Japanese Laid-open Patent Publication No. 2007-248472 is known as a technique according to the related art.

However, in the future, there is a possibility to upgrade route networks even in indoor places. When an indoor route network is provided along with a map, a route distance between spots in indoor places can be calculated. However, when a route distance between points not registered as spots is calculated, the use of a rout network is not realistic.

With the progress in technical development of positioning and the enhancement in precision of position information of a person in an indoor place, indoor maps as well as outdoor maps have been created and the precision of the maps have been enhanced. Accordingly, when it is considered that services in consideration of high-precision position information of a person are provided in a place such as an indoor place in which spatial structures are complicated, designation of a target area using simple shapes as in the related art frequently causes inconvenience.

For example, a service is assumed in which an alarm is rung when someone gets close to a person indoor. At this time, when the closeness is determined using a circular target area, the circle passes through a wall and thus a person present in a neighboring room may be extracted. In this case, an alarm is rung even when no one is present in the present room, and a feeling of wrongness is given to a user, which is erroneous determination. In this way, the area designating method in a spatial search simply allows only the area designation using fixed shapes such as circles, rectangles, and polygons, and an inquiry method about a space corresponding to high-precision position detection and high-precision maps is not provided yet.

SUMMARY

According to an aspect of the invention, a neighborhood creating device includes: a memory; and one or more processors that execute a procedure in the memory, the procedure including a position acquiring process that acquires position information representing a position of a mobile object; a data creating process that creates mobile object data representing a condition associated with a movable range of the mobile object based on the position information; a data acquiring process that acquires obstacle data representing a condition associated with a place through which the mobile object is not able to move; and an information creating process that creates neighborhood information satisfying both conditions represented by the mobile object data and the obstacle data and continuously representing a movable range of the mobile object around the mobile object.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates the arrangement of sample points and charge points based on map data in the first embodiment;

FIG. 6 illustrates the arrangement of sample points and charge points based on map data in the first embodiment;

FIG. 15 illustrates a structural example of position information in the first embodiment;

FIG. 16 illustrates a structural example of sample point data in the first embodiment;

FIG. 17 illustrates a structural example of output data of the neighborhood creating device according to the first embodiment;

FIG. 25 illustrates results of the closeness determination in the second embodiment;

FIG. 29 illustrates a process time depending on a variation in the number of mobile objects which is predicted in the second embodiment;

DESCRIPTION OF EMBODIMENTS

Figure 1:
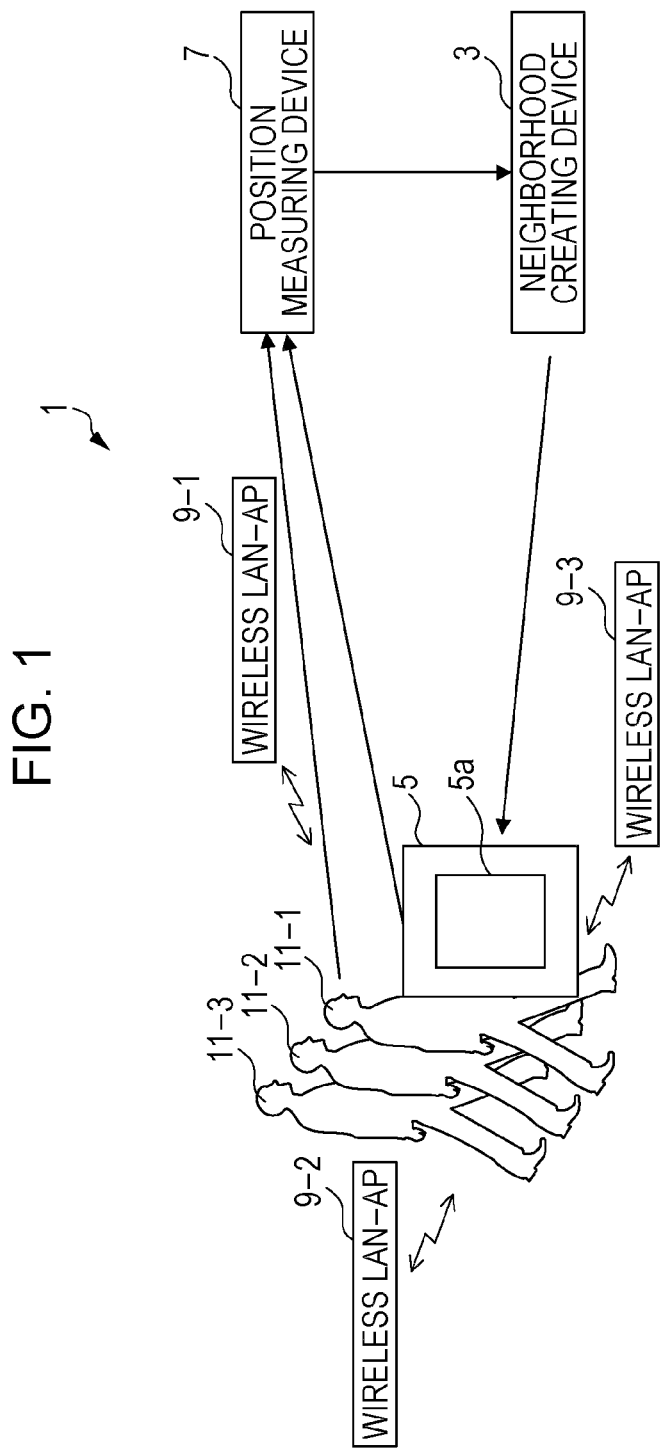
FIG. 1 illustrates the configuration of a neighborhood creating system according to a first embodiment.

Hereinafter, a neighborhood creating system 1 according to a first embodiment will be described with reference to the accompanying drawings. FIG. 1 illustrates the structure of the neighborhood creating system 1 according to the first embodiment. As illustrated in FIG. 1, the neighborhood creating system 1 includes a neighborhood creating device 3, one or more portable terminals 5-1, . . . , 5-n, and three or more local area network (LAN) access points (AP) 9-1, 9-2, 9-3, . . . . The portable terminals 5-1, . . . , 5-n are also collectively or representatively referred to as a portable terminal 5. The APs 9-1, 9-2, . . . are also collectively or representatively referred to as an AP 9. For example, the portable terminal 5 is connected to the neighborhood creating device 3 and a position estimating device 7 via a wireless communication network. A wireless communication network may include, for example, a mobile phone communication network and/or a communication network using a wireless LAN. A base station and/or an extension device connected to the base station may be referred to as an AP 9. The portable terminal 5 and the AP 9 may be connected to each other, for example, via a wireless LAN. The neighborhood creating device 3 and the position estimating device 7 may be connected to each other, for example, via a wired communication network or a wireless communication network.

The neighborhood creating device 3 is a device creating the neighborhood of the portable terminal 5 based on the position of the portable terminal 5 and the peripheral map of the portable terminal 5. For example, the neighborhood of the portable terminal 5 represents the predicted presence location of the portable terminal 5 after the present time point, that is, the latent movable range of the portable terminal 5 and represents a continuous distribution of numerical values on a plane in which the portable terminal 5 is present. The neighborhood area of a mobile object (the portable terminal 5, for example) in this embodiment preferably spreads from the mobile object continuously along movable areas so as to avoid a non-movable place such as a wall. A potential is used to naturally express the shape of the neighborhood area.

The portable terminal 5 is a terminal device such as a portable information terminal and a mobile phone which is carried and moved, for example, persons 11-1, 11-2, . . . (hereinafter, collectively or representatively referred to as a person 11). In this embodiment, the portable terminal 5 is described as an example of the mobile object. The portable terminal 5 includes a display unit 5a having an input unit such as a touch panel, a wireless LAN receiver, a wireless receiver that receives information from the neighborhood creating device 3, a control unit that controls an operation, and a storage unit. The portable terminal 5 enables to input information and enables to display information such as a map or a created neighborhood area.

The portable terminal 5 acquires identification of the APs 9 and information on the time to be consumed in communication by receiving communications from three or more APs 9, and transmits the acquired information as information for estimating the position of the portable terminal 5 to the position estimating device 7. The portable terminal 5 receives neighborhood information created from the neighborhood creating device 3 and presents the received neighborhood information. In this embodiment, an example is described where the neighborhood area of a person 11 is created by creating the neighborhood area of the portable terminal 5.

The position estimating device 7 estimates the position of the portable terminal 5 based on the information acquired from the portable terminal 5 and transmits the estimated position to the neighborhood creating device 3 through a communication network. The position estimating device 7 is, for example, an arithmetic processing unit including a wireless communication unit.

The identification information of the respective APs 9 and the installation locations thereof are stored in the position estimating device 7. The position estimating device 7 acquires the installation locations of the APs 9 by acquiring the identification information of the APs 9, with which the portable terminal 5 communicates, from the portable terminal 5 and calculates the distances between the portable terminal 5 and the APs 9 by acquiring the times, which are consumed in the communication with the APs 9, from the portable terminal 5. The position estimating device 7 estimates the position of the portable terminal 5 from the locations of the APs 9 and the distances between the portable terminal 5 and three or more APs 9. The estimation of the position may employ, for example, a three-point measurement method.

Figure 2:
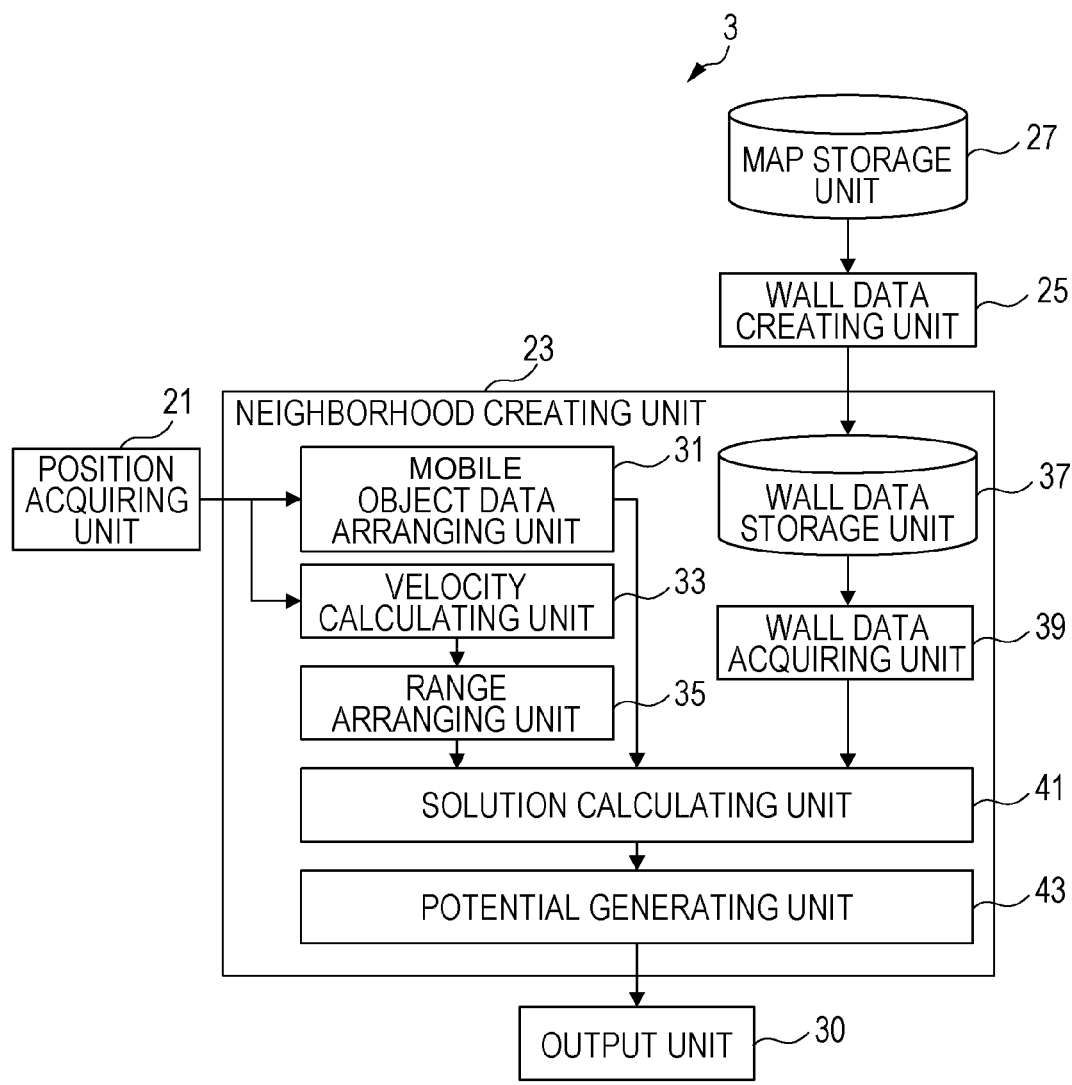
FIG. 2 illustrates the functional configuration of a neighborhood creating device according to the first embodiment.

FIG. 2 illustrates the functional structure of the neighborhood creating device 3. As illustrated in FIG. 2, the neighborhood creating device 3 includes a position acquiring unit 21, a neighborhood creating unit 23, a wall data creating unit 25, a map storage unit 27, and an output unit 30. The position acquiring unit 21 acquires the positional coordinates of the portable terminal 5 and the time at which the portable terminal 5 is present at that position as position information from the position estimating device 7. The map storage unit 27 stores a map representing the periphery of the portable terminal 5. The wall data creating unit 25 creates wall data representing conditions associated with locations through which a mobile object is not able to move based on the map storage unit 27. Details of the wall data will be described later and include information on sample points and charge points based on the map.

The neighborhood creating unit 23 includes a mobile object data arranging unit 31, a velocity calculating unit 33, a range arranging unit 35, a wall data storage unit 37, a wall data acquiring unit 39, a solution calculating unit 41, and a potential generating unit 43. The mobile object data arranging unit 31 arranges mobile object data representing conditions to be set in correspondence with the portable terminal 5 for the purpose of creating a neighborhood area based on the position information of the portable terminal 5 acquired by the position acquiring unit 21. Details of the mobile object data will be described later and includes information on sample points and charge points based on the position of a mobile object.

The velocity calculating unit 33 calculates the moving velocity of the portable terminal 5 based on the position information of the portable terminal 5 acquired by the position acquiring unit 21 and the corresponding time information, for example, the difference between the position at the previous time and the present position. The velocity calculating unit 33 may calculate the moving direction of the portable terminal 5.

The range arranging unit 35 determines a maximum range which serves as a calculation range when creating the neighborhood area of the portable terminal 5, and arranges sample points and charge points to be described later based on the boundary of the maximum range. The maximum range may be, for example, expressed by a circle centered on the position of the mobile object. The radius of the circle may be determined, for example, depending on the moving velocity of the portable terminal 5 calculated by the velocity calculating unit 33.

Although details will be described later, a charge simulation method is used to create the neighborhood area in this embodiment. In the charge simulation method, sample points and charge points are arranged and corresponding conditions are set. A sample point is a point at which a potential value is set as a condition for creating a continuous potential distribution in a plane in which the portable terminal 5 is present. The sample points are located on the boundary. That is, the sample points are located on the boundary between a wall and other spaces in case of the wall data, the sample points are located on a virtual boundary to be described later when they are based on the positions of the mobile object data, and the sample points are located on the boundary of the maximum range when they are based on the maximum range. A charge point is a point which is set as a point at which a potential is generated to correspond to a sample point. The wall data and the mobile object data are information including set potential values at one or more sample points, coordinates of the sample points, and coordinates of one or more charge points.

The wall data storage unit 37 stores the wall data created by the wall data creating unit 25. The wall data acquiring unit 39 reads the wall data stored in the wall data storage unit 37. The solution calculating unit 41 creates simultaneous equations based on the mobile object data, the maximum range, and the wall data and calculates the solutions thereof. The potential generating unit 43 generates a distribution of potentials of the neighborhood area of the portable terminal 5 based on the solutions calculated by the solution calculating unit 41. The output unit 30 is, for example, a communication unit that outputs the result of the potential distribution generated by the neighborhood creating unit 23.

A method of expressing the neighborhood area of a mobile object will be described below. A Laplace potential is most generally used as an expression of a potential. The Laplace potential may be expressed as a solution of a Laplace equation $\Delta\psi=0$. The solution of the Laplace equation has the following features and advantages.

That is, the solution of the Laplace equation is continuously smooth and does not have an extremal value except for a maximum point. Therefore, it is suitable for naturally expressing a shape spreading from a mobile object to avoid a wall by creating a distribution in which the presence position of a person (mobile object) is the maximum and a wall surface is the minimum. Since the solution of the Laplace equation is a function of a position, a quantity (an altitude of potential) is present at a point on a map. This is a quantity decreasing with an increase in distance from the position of the mobile object (the center of the potential) and is thus suitable for use as an indicator of the distance from a mobile object in consideration of a route. The Laplace potential is used as the method of expressing a neighborhood area because of this advantage.

Figure 3:
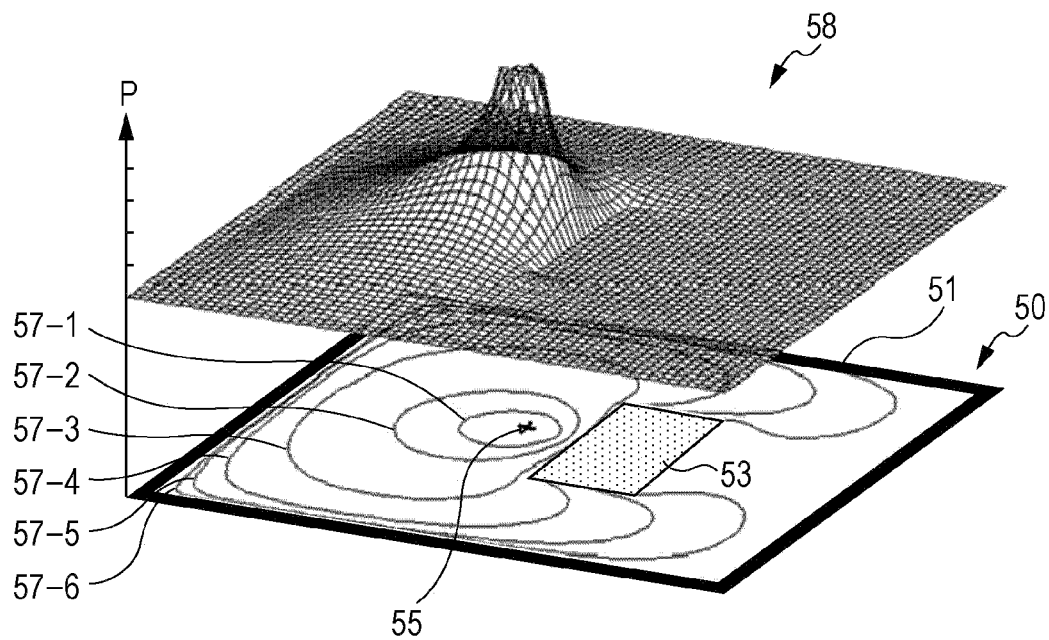
FIG. 3 illustrates an example of neighborhood creation of a portable terminal using a Laplace potential in the first embodiment.

FIG. 3 illustrates an example where the neighborhood of the portable terminal 5 is created using the Laplace potential. FIG. 3 illustrates a neighborhood creation example 50 and a potential distribution 58. In the neighborhood creation example 50, potentials corresponding to the mobile object position 55 in a plane in which a wall 51 and a wall 53 are present are expressed by contours 57-1 to 57-6. The potential distribution 58 expresses the potentials P three-dimensionally. In this way, through the neighborhood creation in this embodiment, the neighborhood area of the portable terminal 5 is expressed as a potential distribution continuously spreading to avoid untraversable areas such as the wall 51 and the wall 53.

For example, when a service of ringing an alarm with the closeness of a person is provided using the neighborhood creation as described in this embodiment, it is requested that an alarm is rung within 1 second at the latest after a person gets close. Accordingly, it is desired to create a neighborhood area without any delay from the position information updated every moment through the positioning. However, the calculation of creating the Laplace potential generally takes much time.

In general, when numerically solving a partial differential equation, a space is divided into lattices and the calculation is performed. However, the Laplace equation is an elliptical partial differential equation and is not able to calculate the values of the lattices as positive values, and thus it is desired to solve large-scale simultaneous equations having the number of lattices formed through the division as a variable. This calculation takes much calculation time. For example, when the calculation of creating the potential of a single mobile object in an area which is vertically and horizontally divided into 100×100 parts (100×100=10,000 meshes) is performed, calculation time of about 1 minute is consumed in calculating the solutions of the simultaneous equations (for example, the operating frequency of the central processing unit is 2.8 GHz and an LU decomposition method is used for the solutions of the simultaneous equations). In order to express the neighborhood area distributed in a complicated indoor structure, it is easy to increase the number of meshes (spatial resolution). When it is considered that the neighborhood areas of plural mobile objects have to be calculated, the general lattice method takes excessive time and is not used well.

Therefore, in order to cope with a problem of the calculation time, the calculation of generating potentials is performed using a charge simulation method. By using the charge simulation method, the time of generating potentials in the order of minutes can be shortened to several milliseconds.

The charge simulation method is an approximate solution method of a partial differential equation. Since the charge simulation method is a simple algorithm, the charge simulation method has features that the calculation time consumed in acquiring an approximate solution is short and relatively-high approximation accuracy can be obtained for a smooth boundary. On the contrary, the charge simulation method has features that an error increases and application thereof is difficult when the boundary shape is complicated. The algorithm of the charge simulation method will be described below.

Figure 4:
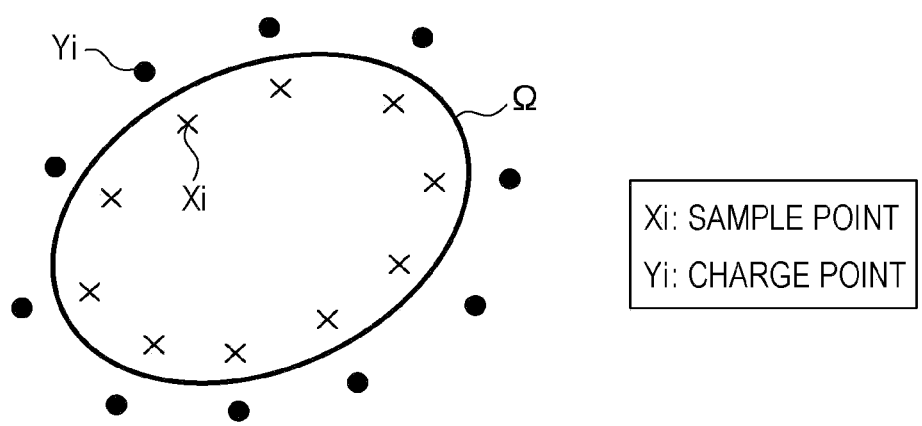
FIG. 4 illustrates a charge simulation method in the first embodiment.

FIG. 4 illustrates the charge simulation method. In the charge simulation method, as described above, sample points and charge points are determined. In the charge simulation method, the following processes are performed. (Process 1) An analysis area from which potentials are calculated is defined as an area $\Omega$ and sample points Xi (where i=1, 2, ..., n; n is a natural number) are selected inside the area $\Omega$. (Process 2) The potential values bi corresponding to the positions of the selected sample points Xi are designated. (Process 3) Charge points Yi (where i=1, 2, ..., n; n is a natural number) are selected outside the area $\Omega$. (Process 4) A solution u(X) is assumed to be the same as Equation 1 and coefficients Qi are determined to satisfy the conditions bi designated by u(Xi) through the use of Equation 2.

$$u(X) = \sum_{i=1}^{n} Qi \log|X - Yi| \qquad \text{(Equation 1)}$$

Here, |X-Yi| represents the distance between a sample point X and a charge point Yi.

$$\begin{pmatrix} \log|X1-Y1| & \log|X1-Y2| & \cdots & \log|X1-Yn| \\ \log|X2-Y1| & \log|X2-Y2| & \cdots & \log|X2-Yn| \\ \vdots & \vdots & \ddots & \vdots \\ \log|Xn-Y1| & \log|Xn-Y2| & \cdots & \log|Xn-Yn| \end{pmatrix} \begin{pmatrix} Q1 \\ Q2 \\ \vdots \\ Qn \end{pmatrix} = \begin{pmatrix} b1 \\ b2 \\ \vdots \\ bn \end{pmatrix} \qquad \text{(Equation 2)}$$

In the charge simulation method, these simultaneous equations have to be solved. However, since the number of unknowns is smaller than that in the lattice solution method in the related art, the calculation time is considerably shortened. For example, a calculation consuming 58 millisecond (msec) or more in the lattice solution method with the number of meshes of 10,000 consumes 1 msec in the charge simulation method with the number of charge points of 60.

In the charge simulation method, by selecting several charge points and sample points along the boundary of a space to be analyzed, potentials are calculated which are smoothly distributed in the boundary and which satisfy the designated conditions on the boundary. By arranging the sample points and the corresponding charge points along the wall surfaces in the indoor map using this feature, the neighborhood creating device 3 generates a potential distribution that spreads along indoor traversable areas. In this embodiment, the sample points and the charge points are automatically arranged along the traversable area based on binary data, which has been generated from the indoor map data, representing the traversable area and the untraversable area.

FIGS. 5 and 6 illustrate the arrangement of sample points and charge points based on the map data. As illustrated in FIG. 5, binary data 95 in which walls 96 are extracted from a map 93 is generated and wall data 97 including sample points 98 and charge points 99 is automatically arranged.

As illustrated in FIG. 6, the Operation of automatically arranging the charge points and the sample points from the binary data is as follows.

Operation 1: An outline 105 and an outline 107 of a wall 101 and a wall 103 which are untraversable areas as illustrated in an outline extraction example 108 are extracted from the binary data in which the wall 101 and the wall 103 are binarized as illustrated in a map 100.

Operation 2: An image process (closing process) of causing the wall 101 and the wall 103 to slightly contract and acquiring a contracted area 109 and a contracted area 111 as illustrated in an area contraction example 110 is performed.

Operation 3: A contracted outline 113 and a contracted outline 114 are extracted from the contracted area 109 and the contracted area 111 of the contracted walls as illustrated in a contracted outline extraction example 112. The contracted outline 113 and the contracted outline 114 are outlines which are present in the untraversable areas of the outline 105 and the outline 107 extracted in Operation 1.

Operation 4: Plural sample points 117 and plural sample points 119 are arranged at equal intervals along the outline 105 and the outline 107 as illustrated in a sample point arrangement example 115.

Operation 5: Points are determined which are present closest to the sample points 117 and the sample points 119 arranged in Operation 4 and which are present on the inside contracted outline 113 or contracted outline 114 as illustrated in a charge point positioning method 116, and plural charge points 121 and plural charge points 123 are arranged as illustrated in a charge point arrangement example 120.

Figure 7A:
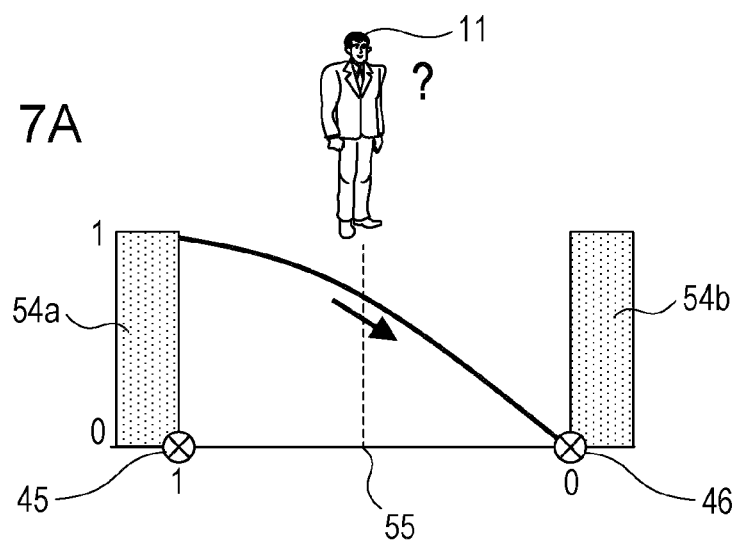
FIG. 7A illustrates an example where a potential distribution spreading from a mobile object is created in the first embodiment.
Figure 7B:
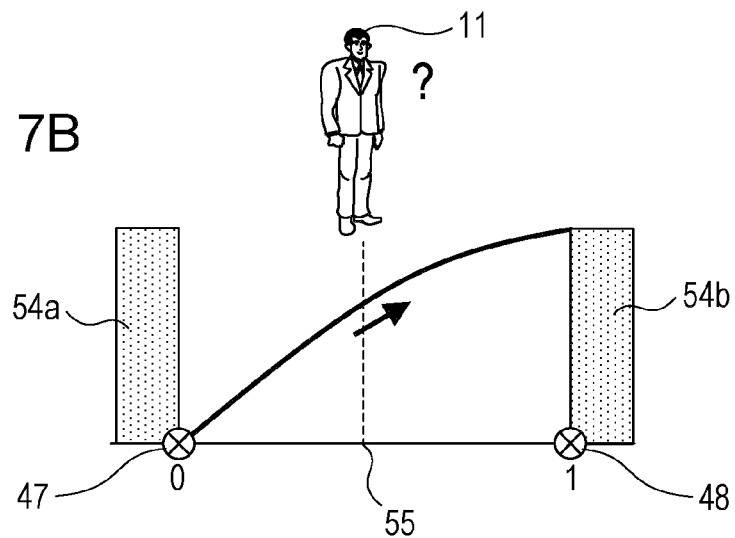
FIG. 7B illustrates another example where a potential distribution spreading from a mobile object is created in the first embodiment.
Figure 7C:
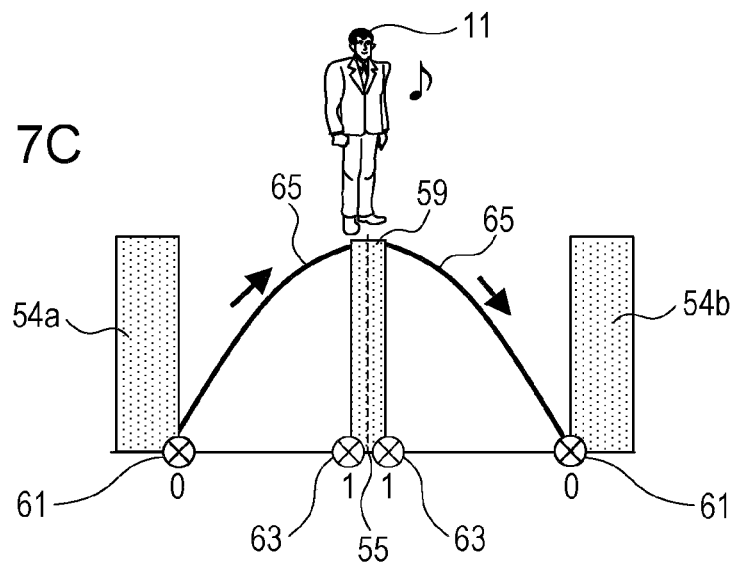
FIG. 7C illustrates another example where a potential distribution spreading from a mobile object is created in the first embodiment.

FIGS. 7A to 7C illustrate examples where a potential distribution spreading from a mobile object is created. In the examples illustrated in FIGS. 7A to 7C, building walls 54 are present and a person 11 (portable terminal 5) is present in the walls 54. Since the charge simulation method is a solution to a boundary value problem, only values on the boundaries can be designated. For example, FIG. 7A illustrates an example where a sample point 45 arranged on the boundary of the left wall 54 in the drawing (referred to as wall 54a for the purpose of distinction) is bound to a potential of 1 and the sample point 46 arranged on the boundary of the right wall 54 in the drawing (referred to as wall 54b for the purpose of distinction) is bound to a potential of 0. FIG. 7B illustrates an example where the sample point 47 arranged on the boundary of the wall 54a is bound to a potential of 0 and the sample point 48 arranged on the boundary of the wall 54b is bound to a potential of 1.

On the other hand, the Laplace potential is distributed to monotonously increase (or decrease) between two boundary points. Accordingly, as illustrated in FIGS. 7A and 7B, a potential distribution having the presence position of a mobile object as an extremal value is not able to be created only by arranging the charge points and the sample points along the walls 54 of the building and designating the bound values.

Therefore, as illustrated in FIG. 7C, potentials centered on (maximized in) the mobile object position 55 are calculated. Accordingly, a virtual boundary 59 is provided to surround the mobile object position 55, the value at the sample point 63 on the boundary is set to a maximum potential of 1, and the values at the sample points 61 on the walls 54 are set to a minimum potential of 0. By designating these conditions and performing the calculation, the potential distribution 65 spreading from the mobile object position 55 may be created.

Figure 8:
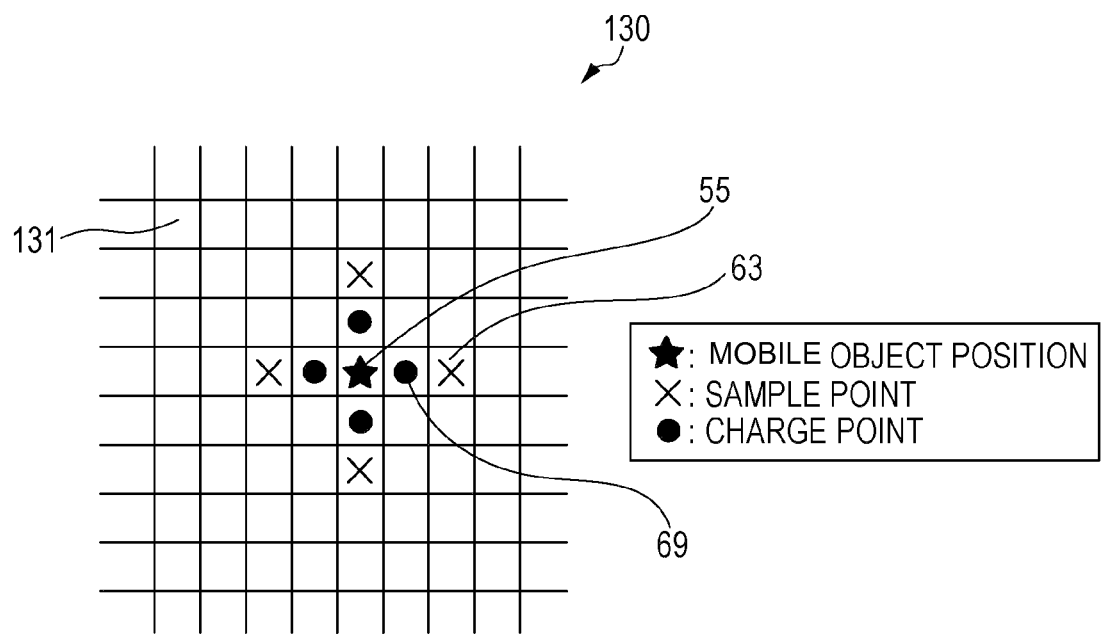
FIG. 8 illustrates an example where sample points and charge points surrounding a mobile object position are arranged in the first embodiment.

FIG. 8 illustrates an example where the sample points 63 and the charge points 69 surrounding the mobile object position 55 are arranged. As illustrated in FIG. 8, when it is assumed that each mesh in mobile object data 130 is a pixel 131, several sample points 63 and several charge points 69 are arranged in the pixels around the mobile object position 55 to surround the mobile object position 55.

Figure 9:
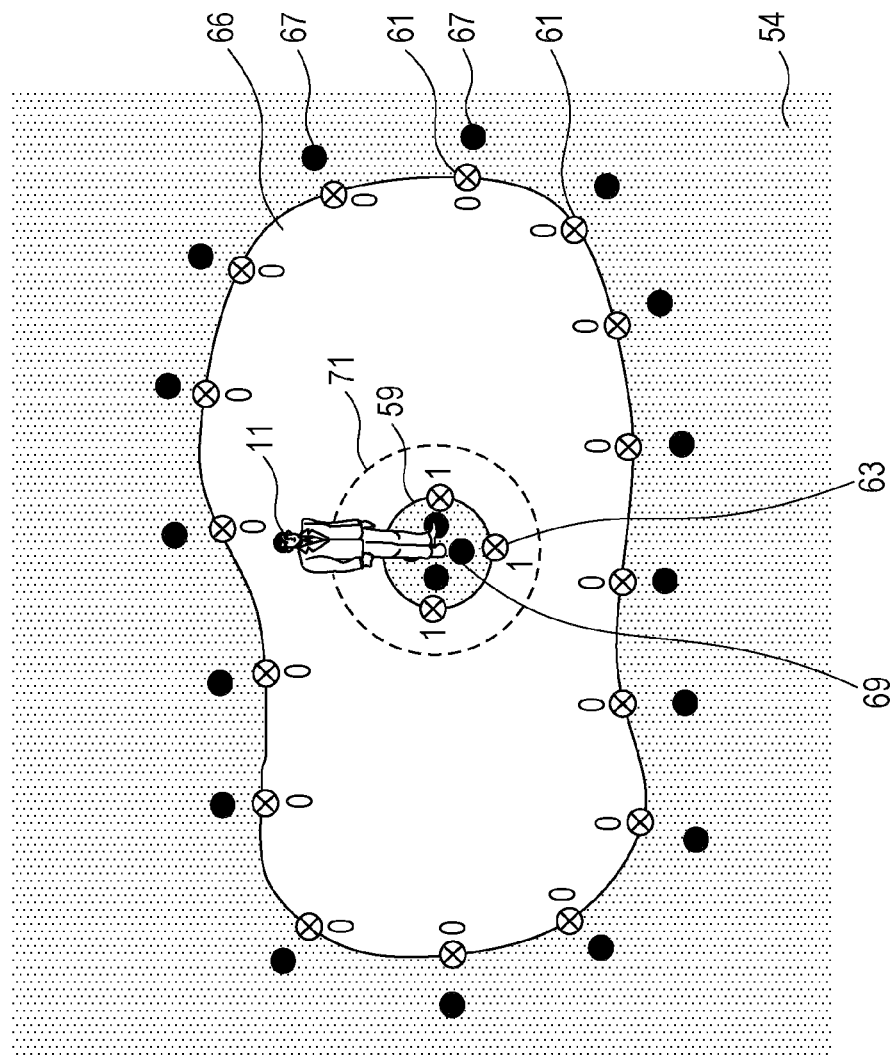
FIG. 9 illustrates an example where sample points and charge points are arranged in the first embodiment.

FIG. 9 illustrates an example of the arrangement of sample points and charge points. As illustrated in FIG. 9, in a space in which a wall 54 is present around a mobile object position 55, plural sample points 61 are arranged on the boundary 66 of the wall 54 and charge points 67 corresponding to the sample points 61 are arranged by performing a closing process on the wall 54. A virtual boundary 59 is arranged around the mobile object position 55, and plural sample points 63 are arranged on the virtual boundary 59. By performing a closing process on the virtual boundary 59, charge points 69 corresponding to the sample points 63 are arranged. The sample points, the charge points, and the like included in the range 71 are made to move with the movement of the mobile object position 55.

Figure 10:
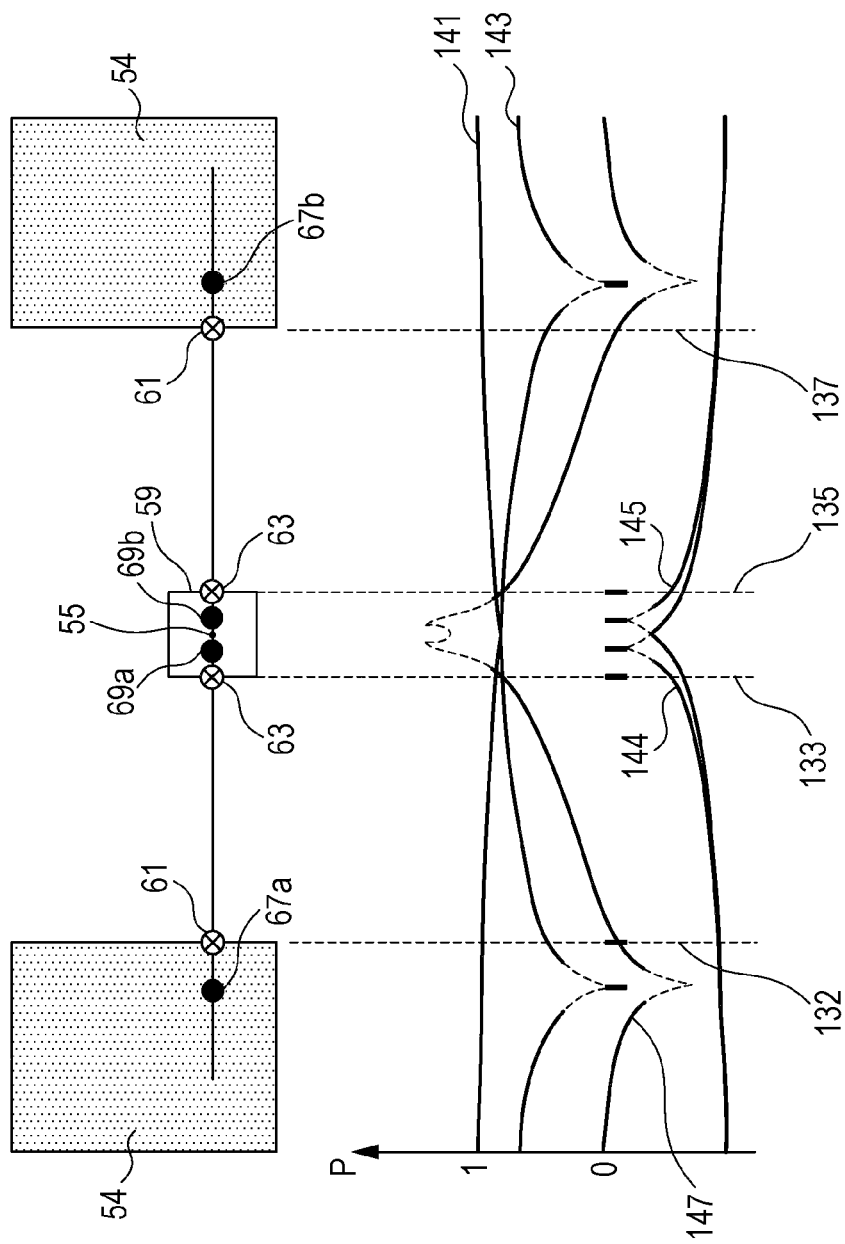
FIG. 10 illustrates an example of function superposition in a charge simulation method in the first embodiment.

FIG. 10 illustrates a function superposition example in the charge simulation method when creating a potential distribution using the above-mentioned method. In FIG. 10, a shape of a potential distribution is illustrated which created to correspond to an arrangement example of sample points 61, sample points 63, charge points 67a and 67b (also collectively referred to as charge points 67), and charging points 69a and 69b (also collectively referred to as charge points 69) in a vertical cross-section passing through the mobile object position 55 when a wall 54 is present around a mobile object position 55.

As illustrated in FIG. 10, for example, a virtual potential 141 is a virtual potential curve generated from the charge point 67a. A virtual potential 143 is a virtual potential curve generated from the charge point 67b. A virtual potential 144 is a virtual potential curve generated from the charge point 69a, and a virtual potential 145 is a virtual potential curve generated from the charge point 69b. The coefficients Qi calculated using Equation 2 are considered in the virtual potentials 141 to 145.

By adding all the virtual potential curves generated from all the charge points 67 and 69 including points not shown and satisfying the conditions at the sample points 61 and 63, a potential distribution 147 is obtained. That is, in the potential distribution 147 based on the conditions of the sample points 61 and 63, the potential at a wall boundary 132 and a wall boundary 137 is set to 0, and the potential at a virtual boundary 133 and a virtual boundary 135 is set to 1.

Figure 11:
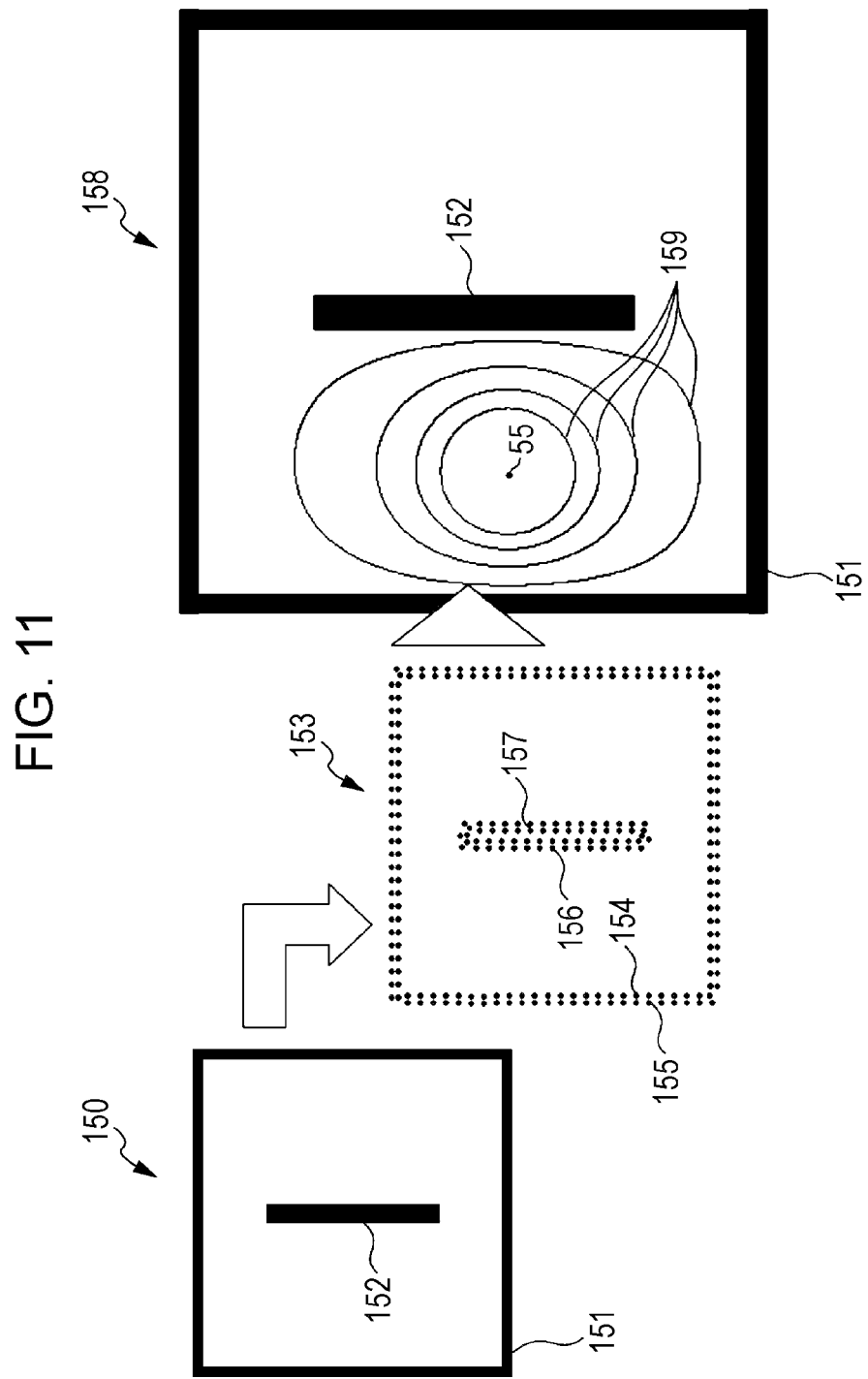
FIG. 11 illustrates creation of potentials in the first embodiment.

FIG. 11 illustrates generation of potentials. As illustrated in FIG. 11, when a wall 151 and a wall 152 are present in a map 150, the neighborhood creating device 3 extracts the outlines of the wall 151 and the wall 152 and performs a closing process thereon as illustrated with reference to FIGS. 5 and 6. Accordingly, as illustrated in wall data 153, plural sample points 156 and plural charge points 157 are arranged. The neighborhood creating device 3 creates a virtual boundary in the neighborhood area of the portable terminal 5, creates potentials, and outputs the result through the use of the output unit 30. The result is information on coordinates of contour lines for displaying contour lines, for example, like potential contour lines 159 of the display example 158. At this time, the potential contour lines 159 spread to avoid the wall 151 and the wall 152.

A calculation error will be described below with reference to FIGS. 12 and 13. A disadvantage of the charge simulation method is that it does not have effective method for suppressing a calculation error. It has been tried to analytically calculate the optimal arrangement of the charge points for reducing the error, but it is basically difficult to suppress an increase in error when the shapes of the boundaries become complicated. The charge simulation method can solve a potential problem at an ultrahigh speed, but it is considered the number of engineering application examples is small due to the error. However, in the application of neighborhood creation in this embodiment, the influence of the error of the charge simulation method can be relatively reduced.

Figure 12:
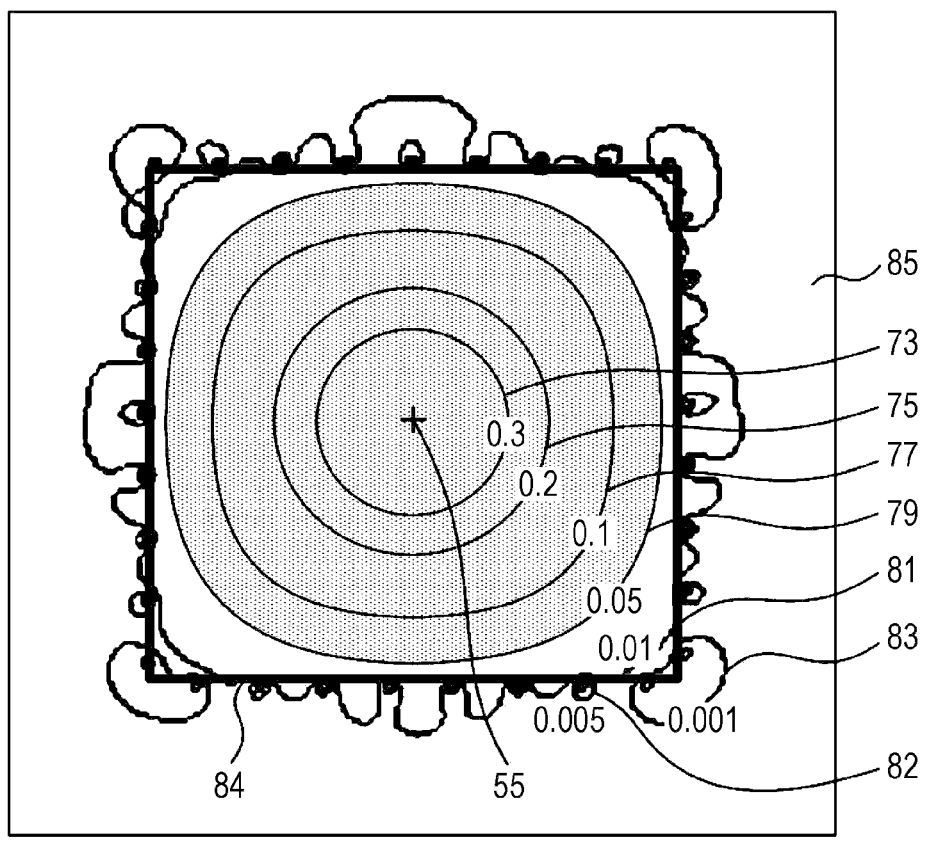
FIG. 12 illustrates a distribution of potentials on a plane, which are calculated using the charge simulation method in the first embodiment.

FIG. 12 illustrates a distribution of potentials on a plane calculated using the charge simulation method. FIG. 13 illustrates the relationship between the potential value and the threshold value. FIG. 12 illustrates an example where a mobile object position 55 is present in a space surrounded with a wall 84. The potential calculation result is marked by potential contour lines 73 to 83.

For example, the potential of the potential contour line 73 is 0.3. The potential of the potential contour line 75 is 0.2, the potential of the potential contour line 77 is 0.1, and the potential of the potential contour line 79 is 0.05. The potential of the potential contour line 81 is 0.01, the potential of the potential contour line 82 is 0.005, and the potential of the potential contour line 83 is 0.001.

It is known that the error of the charge simulation method is the maximum on the boundary (the maximum principle of error). In FIG. 12, it can be seen that the shape of the potential distribution is clearly deformed in the vicinity of the wall 84 as a boundary but a smooth distribution is maintained in the vicinity of the center having a high potential. That is, for example, the potential contour lines 73 to 79 have a relatively small error. However, the potential contour lines 81 to 83 have a deformed shape which is present on the outside 85 of the wall 84 and have an error larger than that in the vicinity of the center. In this way, the error increases with the base of the potential.

In this embodiment, the neighborhood creating system 1 calculates the "neighborhood area" of a mobile object. For example, when the use of closeness determination of determining whether plural mobile objects get close is assumed, setting of the range of the neighborhood area to be wide away from the center of the potential is not typically used. That is, in this embodiment, since only information of a part (the vicinity of the center having a large altitude) having a small potential error generated using the charge simulation method can be used, it is possible to suppress the influence of the error which is the demerit of the charge simulation method.

Figure 13:
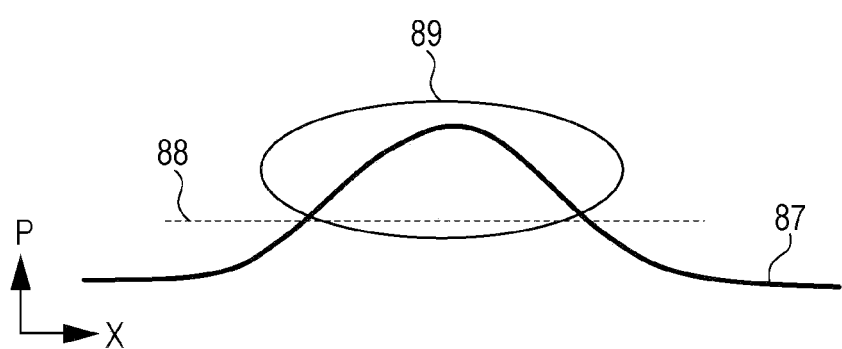
FIG. 13 illustrates the relationship between the values of potentials and a threshold value in the first embodiment.

As illustrated in FIG. 13, a threshold value 88 is provided to a potential distribution 87 and a part of which the potential is higher than the threshold value 88 is used as a usable range 89. Accordingly, only the potential having a small error is used, thereby suppressing the influence of the error.

Figure 14:
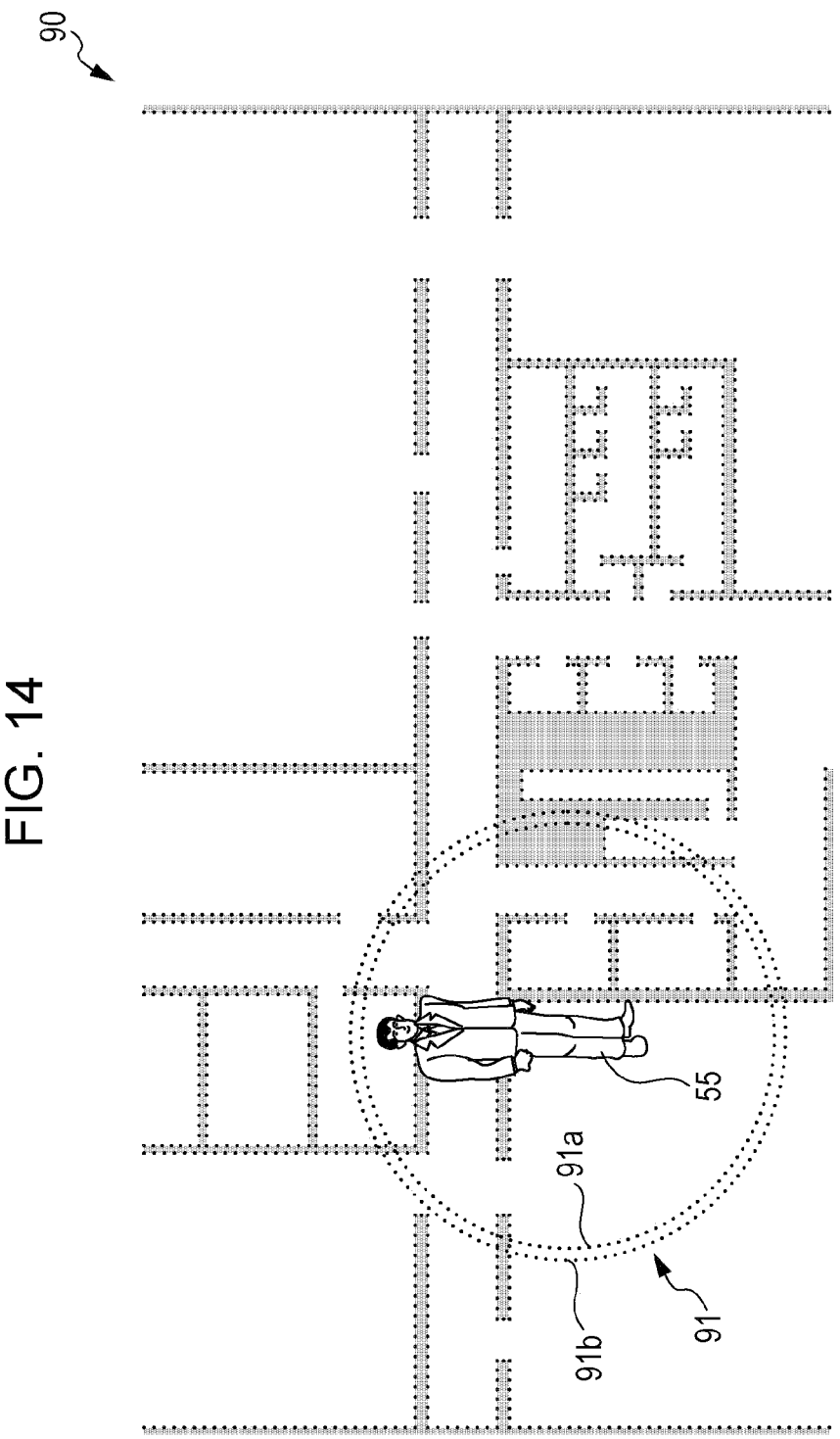
FIG. 14 illustrates an example of a maximum range in the first embodiment.

In order to reduce the calculation load, it is considered that a maximum range for determining the range of the sample points and the charge points used to calculate the potential is set. FIG. 14 illustrates an example of the maximum range. As illustrated in FIG. 14, in a range setting example 90, a maximum range 91 is set as the maximum range in the neighborhood area of a person 11, and a virtual wall is arranged around a mobile object based on the maximum range 91. The virtual boundary based on the maximum range 91 is a boundary having a potential of 0 similarly to the surrounding wall, unlike the virtual boundary 59 around the mobile object position 55. By setting this maximum range 91, the spreading of the potential distribution is in the set maximum range. Here, the maximum range 91 has a circle shape centered on the position of the mobile object position 55.

To correspond to the maximum range 91, plural sample points 91a are arranged on the boundary of the maximum range 91 and the corresponding charge points 91b are arranged outside the maximum range 91 as described above. When the maximum range such as the maximum range 91 is set, a potential distribution which spreads from the mobile object position 55, for example, to the overall map area of the range setting example 90 is not generated. However, by narrowing the ranges of the sample points and the charge points to be calculated so as to be within the maximum range, the calculation load may be reduced.

FIG. 15 illustrates a structural example of position information 162. As illustrated in FIG. 15, the position information 162 is information representing positions of mobile objects and includes a time stamp 164, a mobile object ID 165, and a mobile object position 166. The position information 162 is acquired from the position estimating device 7 by the position acquiring unit 21.

The time stamp 164 represents a time at which the position information 162 is acquired. The mobile object ID 165 is identification information of each mobile object. The mobile object position 166 is coordinates at the time of the time stamp 164 and includes an X coordinate and a y coordinate. For example, the position information 162 represents that a mobile object with a mobile object ID of 001 is located at a position of x=12.380 and y=45.173 at 17:14:32 of Apr. 27, 2012. The position information 162 is acquired every predetermined time and is stored in a storage unit not shown in the neighborhood creating device 3.

FIG. 16 illustrates a structural example of sample point data 168. The sample point data 168 includes an ID 170, an X coordinate 171, and a Y coordinate 172. The ID 170 is identification information of a sample point. The X coordinate 171 and the Y coordinate 172 are coordinates of a sample point. The sample point data 168 represents that, for example, a sample point with an ID of 001 is a point located at a position of x=24 and y=18. As described above, the sample points are arranged on the outline extracted based on the map stored in the map storage unit 27, on the virtual boundary 59, or on the boundary of the maximum range 91. The charge points are configured as the charge point data having the same configuration. The sample point data 168 and the charge point data are input to the solution calculating unit 41.

FIG. 17 illustrates a structural example of the output data of the neighborhood creating device 3. Neighborhood data 175 is the output data of the neighborhood creating device 3 and includes a mobile object ID 176, an X coordinate 177, a Y coordinate 178, and a potential 179. The neighborhood data 175 represents that, for example, the potential of the mobile object with an ID 176 of 101 is calculated to be 0.05 at a point of X=10 and Y=15.

Figure 18:
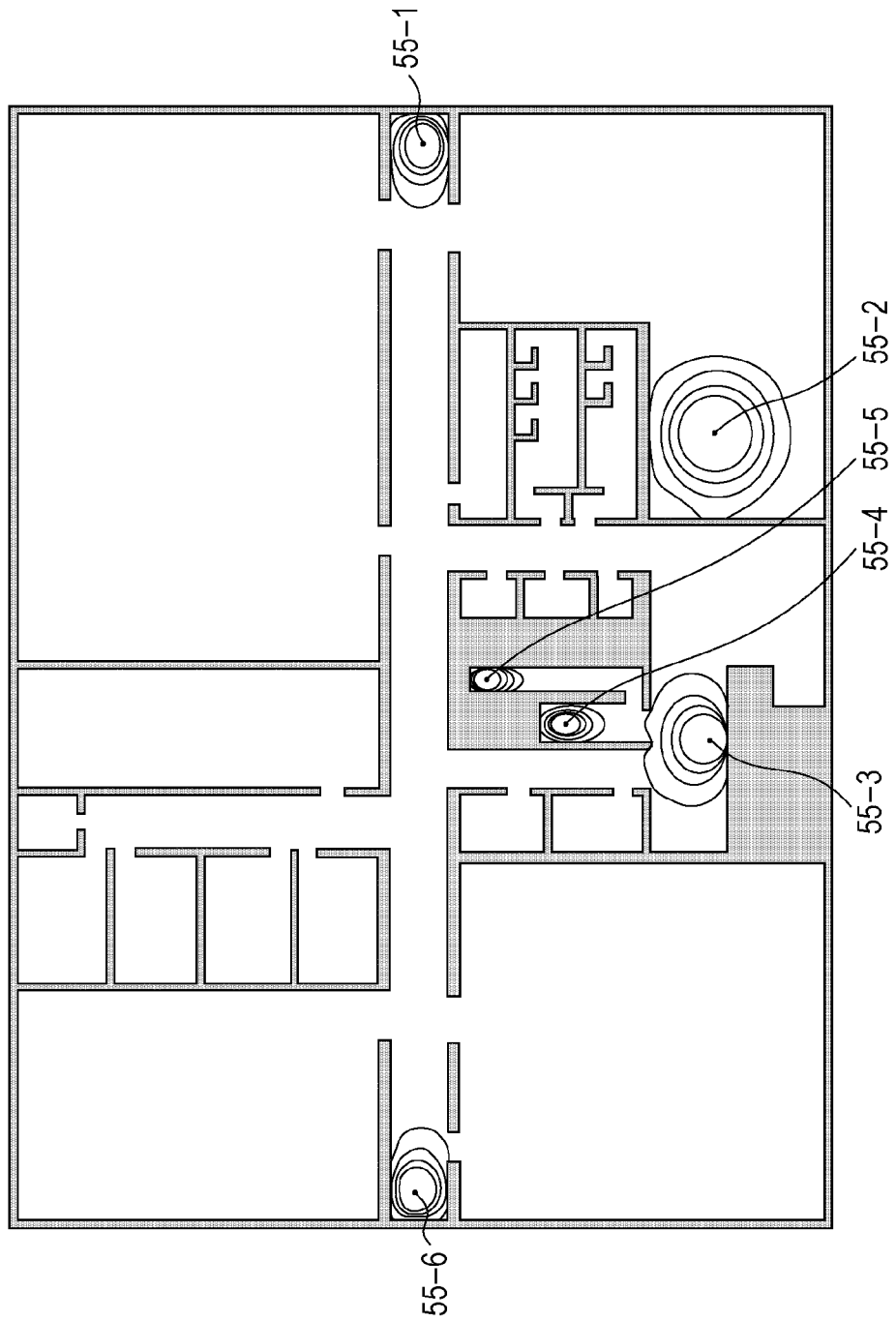
FIG. 18 illustrates a display example of a neighborhood area based on potentials in the first embodiment.

FIG. 18 illustrates a display example of a neighborhood area using the potentials calculated as described above. As illustrated in FIG. 18, a display example 180 expresses the neighborhood areas created for the mobile object positions 55-1 to 55-6 by the use of potential contour lines. It can be seen that the neighborhood areas corresponding to the mobile object positions 55-1 to 55-6 spread to avoid untraversable walls.

Figure 19:
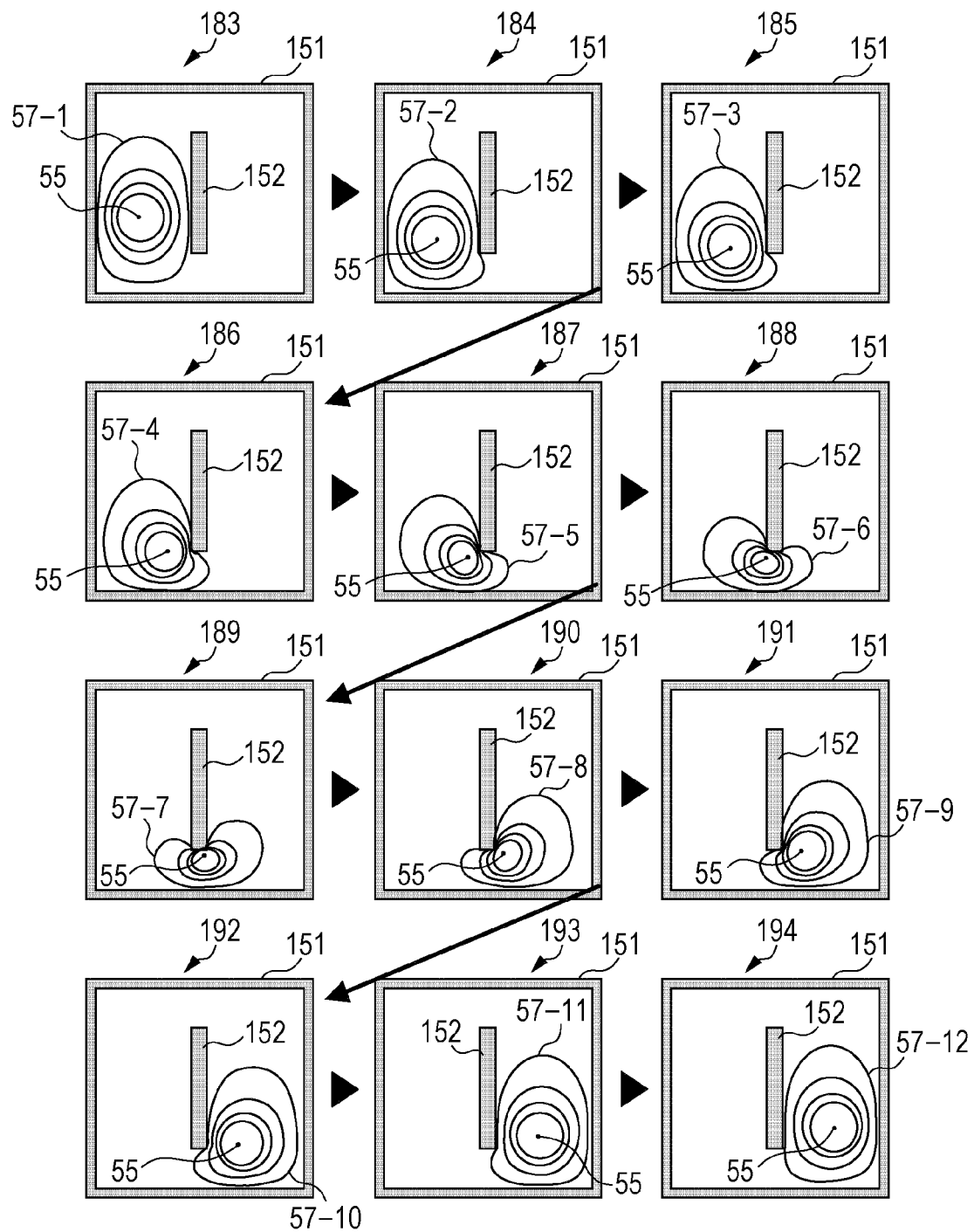
FIG. 19 illustrates a temporal variation of a neighborhood area of a mobile object position in the first embodiment.

FIG. 19 illustrates a temporal variation of a neighborhood area of a mobile object position 55. FIG. 19 illustrates states where the neighborhood area of the mobile object position 55 moves as expressed by the contour lines 57-1 to 57-12 in display examples 183 to 194. In the display examples 183 to 194, the neighborhood area of the mobile object position 55 spreads and moves to avoid the walls 151 and 152.

Figure 20:
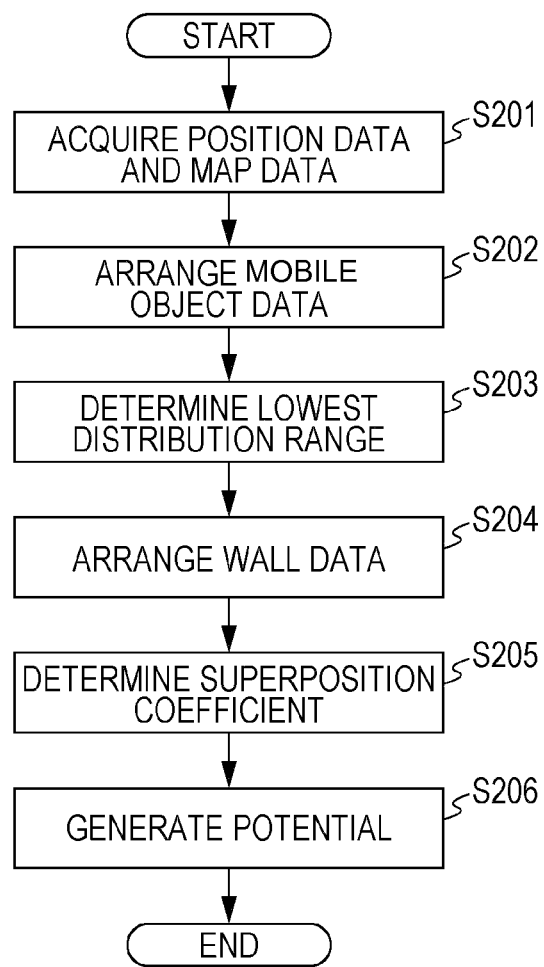
FIG. 20 illustrates an operation method of the neighborhood creating device according to the first embodiment.

The operating method of the neighborhood creating system 1 having the above-mentioned configuration will be described with reference to FIG. 20. FIG. 20 illustrates the operating method of the neighborhood creating device 3. As illustrated in FIG. 20, the position acquiring unit 21 of the neighborhood creating device 3 acquires the position information 162 at a certain time. The wall data acquiring unit 39 acquires the sample point data 168 and the charge point data having the same configuration as the sample point data 168 from the wall data storage unit 37 (S201).

The mobile object data arranging unit 31 sets a virtual boundary 59 of the mobile object position 55 based on the acquired position information 162 as described with reference to FIG. 7C and arranges the sample points 63 and the charge points 69 to the virtual boundary 59 based on the acquired position information as illustrated in FIG. 8 (S202).

The range arranging unit 35 determines the maximum range 91 as illustrated in FIG. 14 and arranges the sample points and the charge points based on the maximum range 91 (S203). The wall data acquiring unit 39 arranges the wall data based on the map storage unit 27 by acquiring, for example, the sample point data 168 and the corresponding charge point data which are created by the wall data creating unit 25 and stored in the wall data storage unit 37 (S204).

The solution calculating unit 41 determines the superposition coefficients Qi by solving the simultaneous equation 2 (S205). The potential generating unit 43 superposes all the potentials reflecting the coefficients Qi determined in S205 to create a potential distribution (S206).

Figure 21:
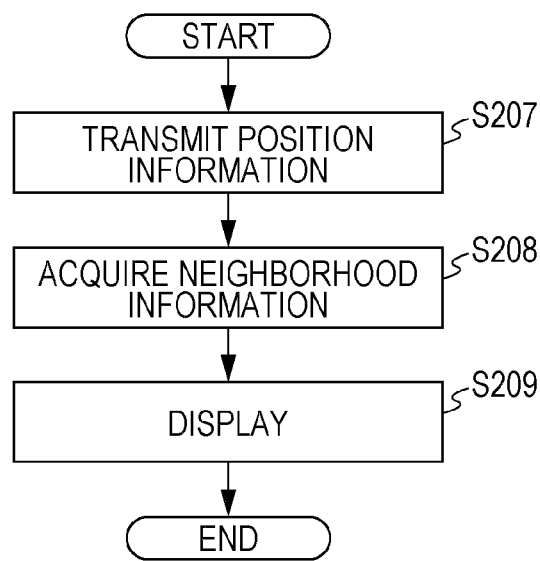
FIG. 21 illustrates an operation method of a portable terminal in the first embodiment.

FIG. 21 illustrates the operating method of a portable terminal 5. As illustrated in FIG. 21, the portable terminal 5 receives communications from at least three APs 9 and transmits the identification information of the APs 9 and the information on the time consumed in the communications to the position estimating device 7 (S207). When the neighborhood creation in the neighborhood creating device 3 described with reference to FIG. 20 is ended, the portable terminal 5 acquires the created neighborhood information (S208). The portable terminal 5 displays the acquired information on the display unit 5a, for example, as illustrated in the display example 180 of FIG. 18 or the display examples 183 to 194 of FIG. 19.

As described above, in the neighborhood creating system 1 according to the first embodiment, the portable terminal 5 communicates with at least three APs 9 and transmits the result to the position estimating device 7, and thus the position estimating device 7 specifies the position of the portable terminal 5. The neighborhood creating device 3 acquires the position data of the portable terminal 5 from the position estimating device 7. In the neighborhood creating device 3, the mobile object data arranging unit 31 arranges, for example, the mobile object data 130 based on the acquired position data, and the range arranging unit 35 determines the maximum range of the neighborhood area based on the calculation result of the velocity calculating unit 33. On the other hand, the wall data acquiring unit 39 acquires, for example, the wall data 97 based on the map and arranges the sample points and the charge points. The solution calculating unit 41 creates the simultaneous equation 2 based on the arranged mobile object data 130 and the arranged wall data 97, and calculates the coefficients Qi as the solutions of the equations. The potential generating unit 43 creates the distribution of potentials with the mobile object based on the solutions of the solution calculating unit 41.

As described above, in the neighborhood creating system 1 according to the first embodiment, the walls and the like through which a mobile object is not able to move are extracted and the outlines thereof are extracted, for example, using a map which has been converted into binary image data of walls and passages. A closing process is performed on the walls to extract outlines, the sample points are arranged along the outlines of the walls, and the charge points are arranged along the outlines subjected to the closing process. Accordingly, the wall data including information of the sample points and the charge points based on the map may be automatically arranged.

On the other hand, by acquiring the mobile object position 55 of the portable terminal 5 specified by the portable terminal 5 and the position estimating device 7, the mobile object data including the sample points and the charge points based on the mobile object position 55 may be automatically arranged.

At this time, it is possible to create the neighborhood using high-accuracy position detection, in which a position is acquired, for example, using the wireless LAN-APs, as the indoor positioning method of acquiring position information in a place which GPS signals do not reach, such as stations or commercial facilities.

According to the neighborhood creating system 1, it is possible to create a neighborhood area in consideration of walls through which a person 11 is not able to move and to create neighborhood suitable for the circumstances such as moving paths. That is, a potential distribution spreading along indoor traversable areas may be created, for example, by arranging the charge points and the sample points along the wall surfaces on an indoor map. By employing the charge simulation method which is a numerical solution method of a partial differential equation as a method of calculating a potential at a high speed, it is possible to perform processes at a speed at which the neighborhood creating process can be performed in real time.

The solution of the Laplace equation used to create the neighborhood has the following features and merits. That is, the solution of the Laplace equation is continuously smooth and does not have an extremal value other than a maximum point. Therefore, it is possible to naturally express a shape which spreads from a mobile object to avoid walls by creating a potential distribution in which the presence position of a person (mobile object) is the maximum and the wall surface is the minimum. Since the solution of the Laplace equation is a function of a position, a quantity (an altitude of potential) is present at a point on a map. This is a quantity decreasing with an increase in distance from the position of the mobile object (the center of the potential) and is thus suitable for creating the neighborhood of a mobile object.

According to the neighborhood creating system 1, it is possible to create a neighborhood area, which is defined for each mobile object, which has a continuous distribution, and which varies depending on the behavior of a mobile object or the surrounding spatial structure, at a high speed using high-accuracy positions and a high-accuracy map. Therefore, a detailed neighborhood creating service without erroneous determination may be realized in an indoor place.

At this time, a potential distribution in which the presence position of a mobile object is the maximum point and which spreads along traversable areas such as passages to avoid obstacles (walls) may be used as the neighborhood area of a mobile object. That is, sample points arranged along the walls and sample points arranged to surround the center of the mobile object are set using the calculation of the charge simulation method, and the conditions are designated such that the value at the sample points around the mobile object is the maximum and the value at the sample points of the walls is the minimum. Accordingly, it is possible to calculate a potential distribution which spreads from the position of the mobile object to avoid the walls at a high speed. By restricting the range of a neighborhood area, it may be made to be difficult to receive the influence of an error specific to the charge simulation method.

By arranging the sample points 91a and the charge points 91b, for example, on a circle centered on a mobile object and setting a virtual wall, only the sample points and the charge points within the range of the range setting example 90 are subjected to the calculation, thereby enhancing the processing speed. The maximum range of the neighborhood area may be designated arbitrarily.

In this way, it is possible to create a "neighborhood area" of a mobile object, which is used to realize an indoor position information service, at a high speed. According to the neighborhood creating system 1, since places which a person is able to pass through or to be present in are restricted due to an indoor building structure, it is possible to provide a method of defining a neighborhood area in consideration of the structure.

Modification Example

Hereinafter, a modification example will be described. The configuration of a neighborhood creating system according to this modification example is the same as the configuration of the neighborhood creating system 1 according to the first embodiment. Therefore, the same elements are referenced by the same reference numerals and the description thereof will not be repeated.

In the modification example, the velocity calculating unit 33 illustrated in FIG. 2 calculates the moving speed and the moving direction of a portable terminal 5 based on the position information of the portable terminal 5 and the corresponding time information acquired by the position acquiring unit 21 and, for example, the difference between the previous position and the present position.

In this modification example, the range arranging unit 35 deforms the maximum range based on the moving speed and the moving direction calculated by the velocity calculating unit 33 when arranging the calculation range for crating the neighborhood area of the portable terminal 5. The deforming method will be described later. The solution calculating unit 41 creates simultaneous equations based on the mobile object data, the maximum range based on the velocity, and the wall data and calculates the solutions thereof, thereby calculating the solutions based on the deformed maximum range.

Figure 22:
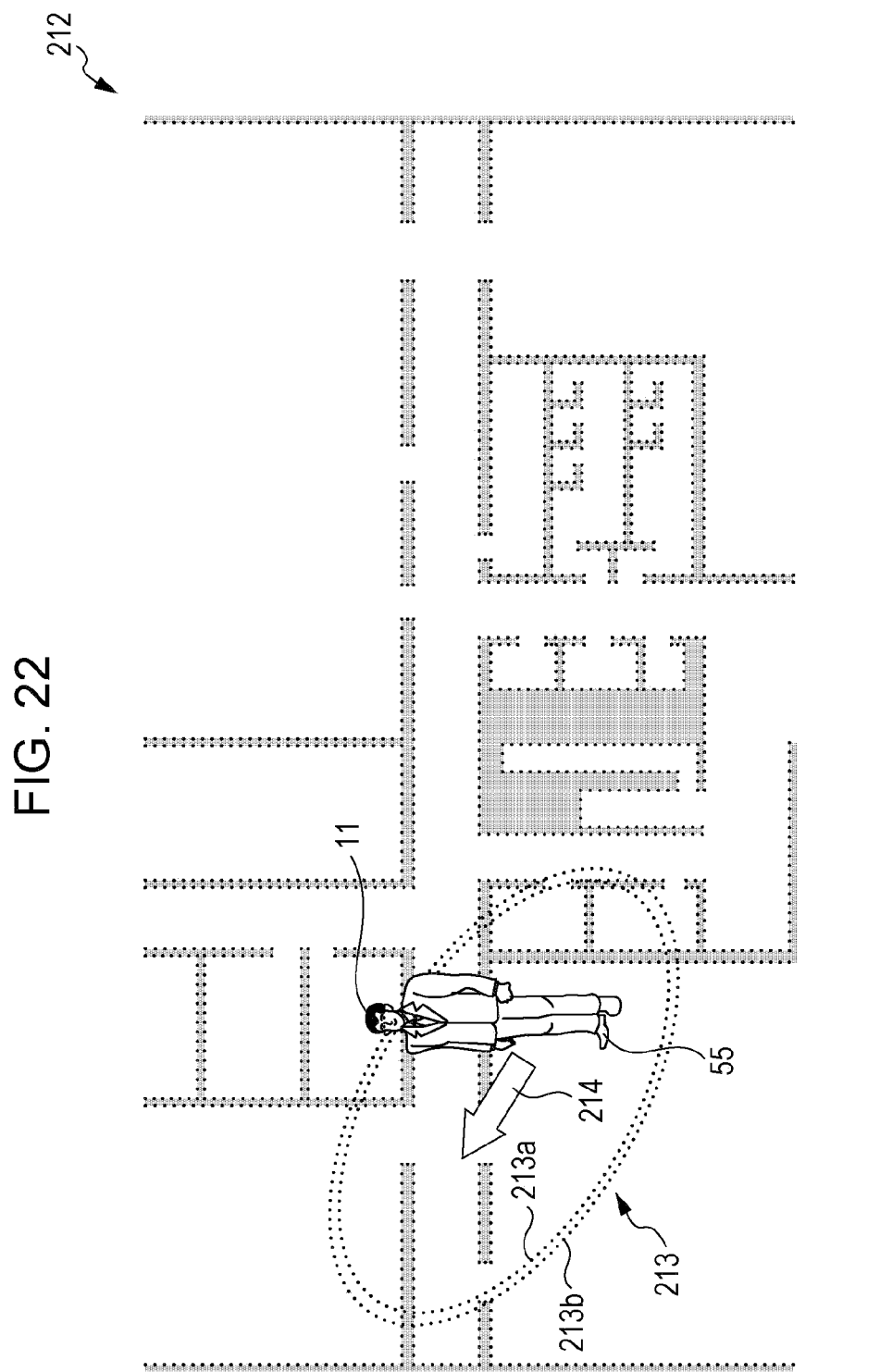
FIG. 22 illustrates an example of range setting in a modification example.

FIG. 22 illustrates a modification of the range setting example 90 illustrated in FIG. 14. As illustrated in FIG. 22, in this modification example, the maximum range 213 is deformed depending on the velocity 214 as illustrated in a range setting example 212. At this time, the velocity calculating unit 33 calculates the velocity 214 and the traveling direction of the person 11 (the portable terminal 5) based on the position information 162. The range arranging unit 35 changes, for example, the ratio of the major axis and the minor axis of the maximum range 213 based on the calculated velocity vector 214 to set the range to an ellipse of which the major axis is matched with the traveling direction of the portable terminal 5. It may be also considered that the center, the major axis, and the minor axis of the ellipse are changed depending on the velocity and the traveling direction of the mobile object. The other configurations and operations are the same as those of the neighborhood creating system 1 according to the first embodiment and thus description thereof will not be repeated.

As in this modification example, the shape of the maximum range 213 is set to an ellipse, not to a simple circle, and is deformed depending on the velocity 214 and the traveling direction. Accordingly, the neighborhood area reflects the behavior of the mobile object as well as the spatial structure, and it is thus possible to determine the closeness including prediction.

Hereinafter, a neighbor creating system according to a second embodiment will be described with reference to FIGS. 23 to 30. In this embodiment, the same elements and operations as in the first embodiment and the modification example will be referenced by the same reference numerals and detailed description thereof will not be repeated.

Figure 23:
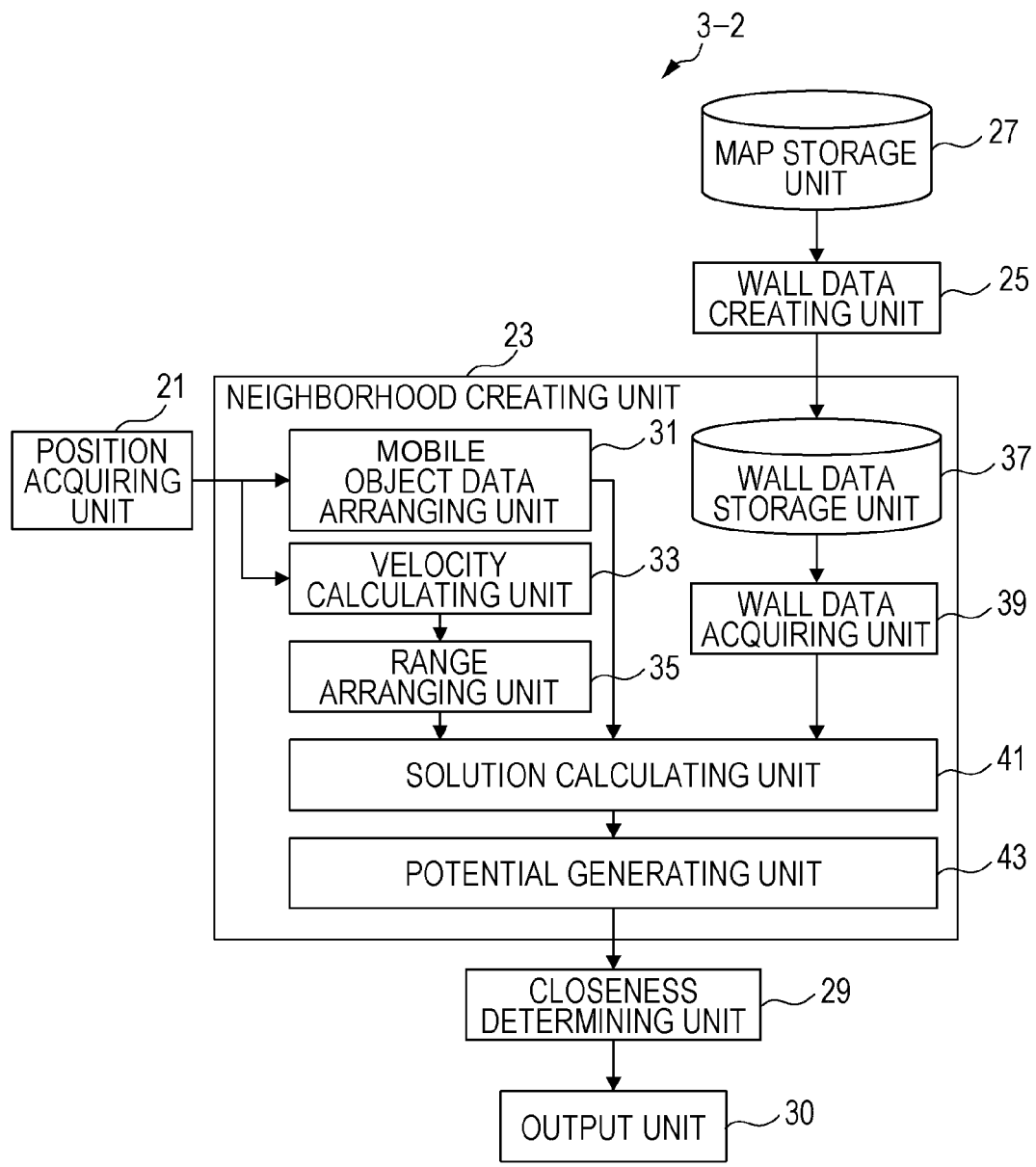
FIG. 23 illustrates a functional structure of a neighborhood creating device according to a second embodiment.

FIG. 23 illustrates the functional configuration of a neighborhood creating device 3-2 according to the second embodiment. As illustrated in FIG. 23, the neighborhood creating device 3-2 includes a position acquiring unit 21, a neighborhood creating unit 23, a wall data creating unit 25, a map storage unit 27, a closeness determining unit 29, and an output unit 30.

The neighborhood creating device 3-2 according to this embodiment includes the closeness determining unit 29 in addition to the neighborhood creating device 3 according to the first embodiment and the modification example. The neighborhood creating unit 23 creates a neighborhood area for each of plural mobile objects, and the closeness determining unit 29 determines whether the plural mobile objects are present in the predetermined neighborhood areas based on a potential distribution representing the neighborhood area created for each mobile object. The output unit 30 outputs the determination result of the closeness determining unit 29.

Figure 24:
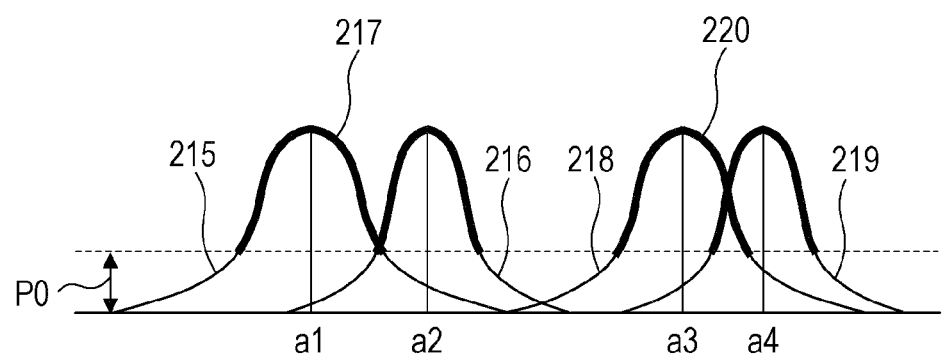
FIG. 24 illustrates closeness determination in the second embodiment.

FIG. 24 illustrates the closeness determination. As illustrated in FIG. 24, potential distributions 215, 216, 218, and 219 are created for the mobile objects at positions a1 to a4 in a vertical cross-section of a space in which the mobile objects are present. A threshold value P0 is set as a threshold value for the closeness determination. This threshold value is a reference value used to determine that the mobile objects are close to each other when the potential at an intersection of the potential distributions created for the different mobile objects is higher than the threshold value.

In the example shown in FIG. 24, parts of which the potential is higher than the threshold value P0 are extracted from the potential distributions 215, 216, 218, and 219. Accordingly, the potential distribution 217 and the potential distribution 220 marked by a bold line are extracted. At this time, since the mobile objects corresponding to the potential distributions 215 and 216 belong to the same group of potential distribution 217, it is determined that both are close to each other. Similarly, since the mobile objects corresponding to the potential distributions 218 and 219 belong to the same group of potential distribution 220, it is determined that both are close to each other. Actually, the portions of which the potential is higher than the threshold value are extracted from the potential distributions of the neighborhood areas of all the mobile objects and the closeness determination is performed.

FIG. 25 illustrates a result of the closeness determination. When the presence of a wall 221 is not considered as in a closeness determination example 227 of FIG. 25, a route 225 representing the shortest distance between the mobile object 223 and the mobile object 224 intersects the wall 221 at an intersection 226 and is a route which is actually untraversable. In a closeness determination example 229, since the neighborhood area is created to avoid the wall 221, a route 228 is a route reflecting the wall 221 and the closeness determination is performed based on the route 228.

Figure 26:
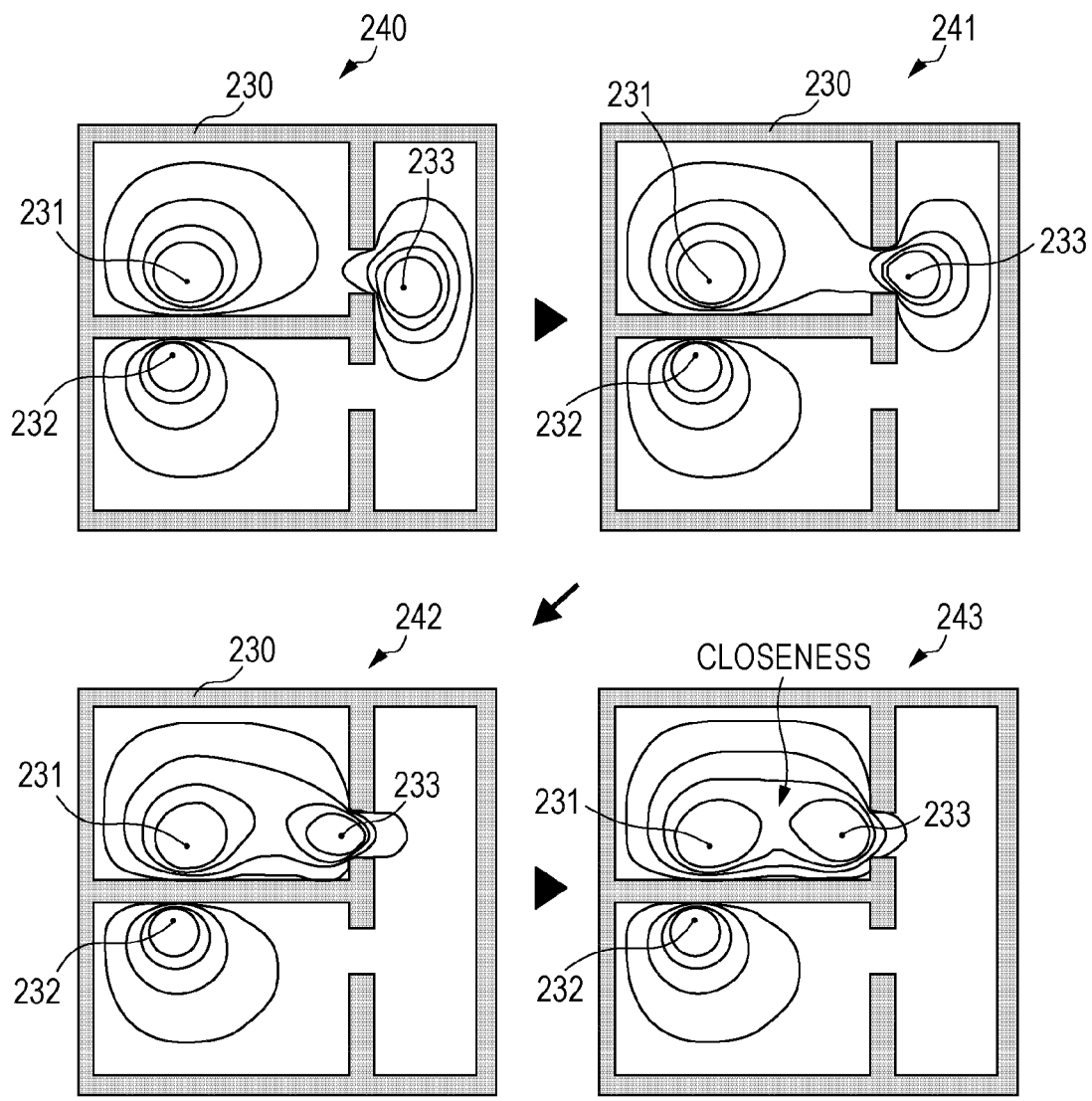
FIG. 26 illustrates closeness determination when plural mobile objects are present in a space inside a wall in the second embodiment.

FIG. 26 illustrates the closeness determination when mobile objects 231 to 233 are present in a space inside walls 230. It is assumed that the time passes in the order of a display example 240, a display example 241, a display example 242, and a display example 243. As illustrated in FIG. 26, in the walls 230, the mobile objects 231 to 233 are present in places partitioned by the walls 230. In the display examples 241 to 243, the mobile object 233 slowly gets close to the mobile object 231. In the display example 243, the mobile object 231 and the mobile object 233 are determined to be close to each other. However, since the mobile object 231 and the mobile object 232 interpose the wall 230 therebetween, the potential distributions thereof do not overlap with each other and both are not determined to belong to the same group. As a result, both mobile objects 231 and 232 are not determined to be close to each other.

Figure 27:
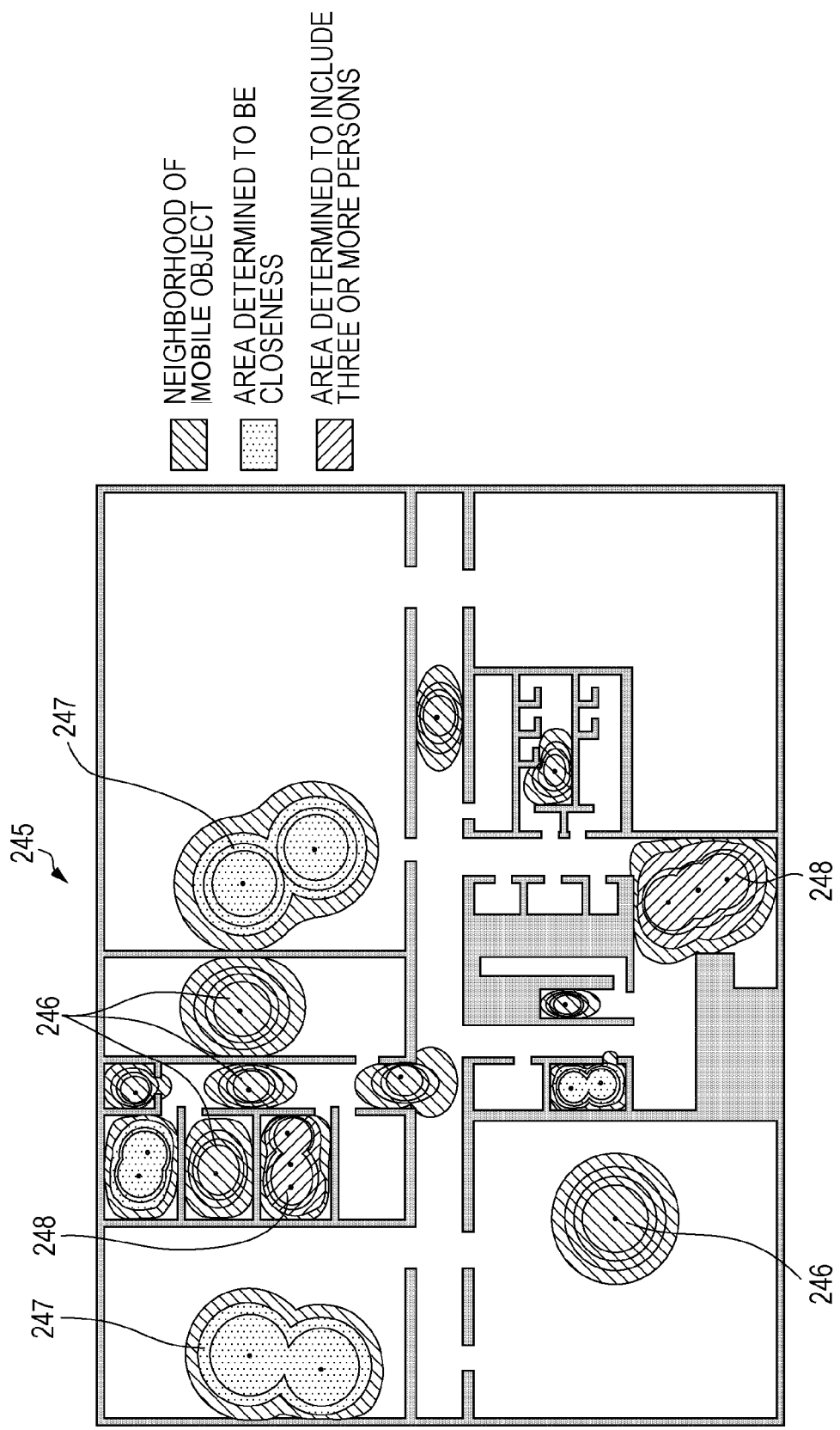
FIG. 27 illustrates a display example of closeness determination of plural mobile objects in the second embodiment.

FIG. 27 illustrates a display example for determining the closeness of plural mobile objects. This display example 245 is prepared by assuming dummy tracks of plural mobile objects freely moving on a target map and causing the neighborhood creating device 3 to perform the closeness determination of the mobile objects moving along the dummy tracks. In the example illustrated in FIG. 27, a group 247 of two mobile objects determined to be close to each other and a group 248 of three mobile objects are distinctly displayed in addition to neighborhood areas 246 of single mobile objects.

Figure 28:
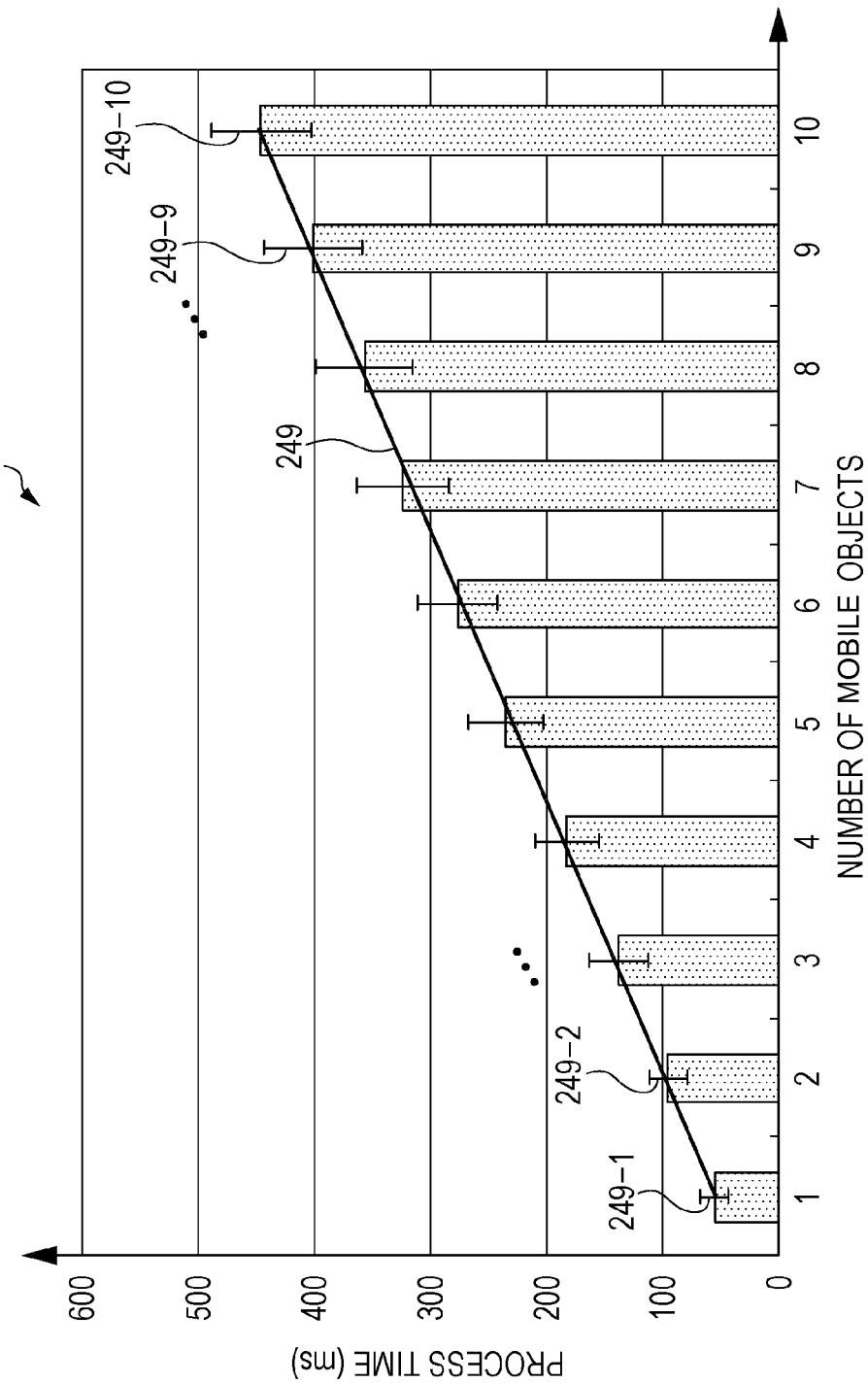
FIG. 28 illustrates a variation in process time when the number of mobile objects varies in the closeness determination in the second embodiment.

FIG. 28 illustrates a variation in process time when the number of mobile objects varies in the closeness determination of the second embodiment. FIG. 29 illustrates the process time due to the variation in the number of mobile objects predicted from the relationship illustrated in FIG. 28. The number of mobile objects represents the number of mobile objects of which the neighborhood area will be created by the neighborhood creating unit 23 for the purpose of the closeness determination of the closeness determining unit 29. The process time represents the time until the display of a result is completed after the portable terminal 5 as one mobile object transmits information for specifying a position to the position estimating device 7.

In FIG. 28, the horizontal axis represents the number of mobile objects and the vertical axis represents the process time. Through conversion from the scale of the map used for the calculation, the length of each pixel is 1.24 m. The number of charge points is 534 and the operating frequency of the neighborhood creating device 3 used for the calculation is 2.8 GHz.

In FIG. 28, the ranges of the measured process times when the number of mobile objects are 1 to 10 are illustrated as measured values 249-1 to 249-10. It is thought that the relationship between the number of mobile objects and the process time is expressed as a straight line 249 based on the measured values 249-1 to 249-10. That is, it is thought that the process time linearly increases with the increase in the number of mobile objects. In the example illustrated in FIG. 28, the closeness determining process can be performed in the process time of about 44 msec for each mobile object.

When the process time depending on the number of mobile objects is predicted using the straight line 249, as illustrated in FIG. 29, the process time with the number of mobile objects of 20 is 922 ms and the process time with the number of mobile objects of 30 is 1356 ms. Similarly, the process time with the number of mobile objects of 100 is 4391 ms.

Figure 30:
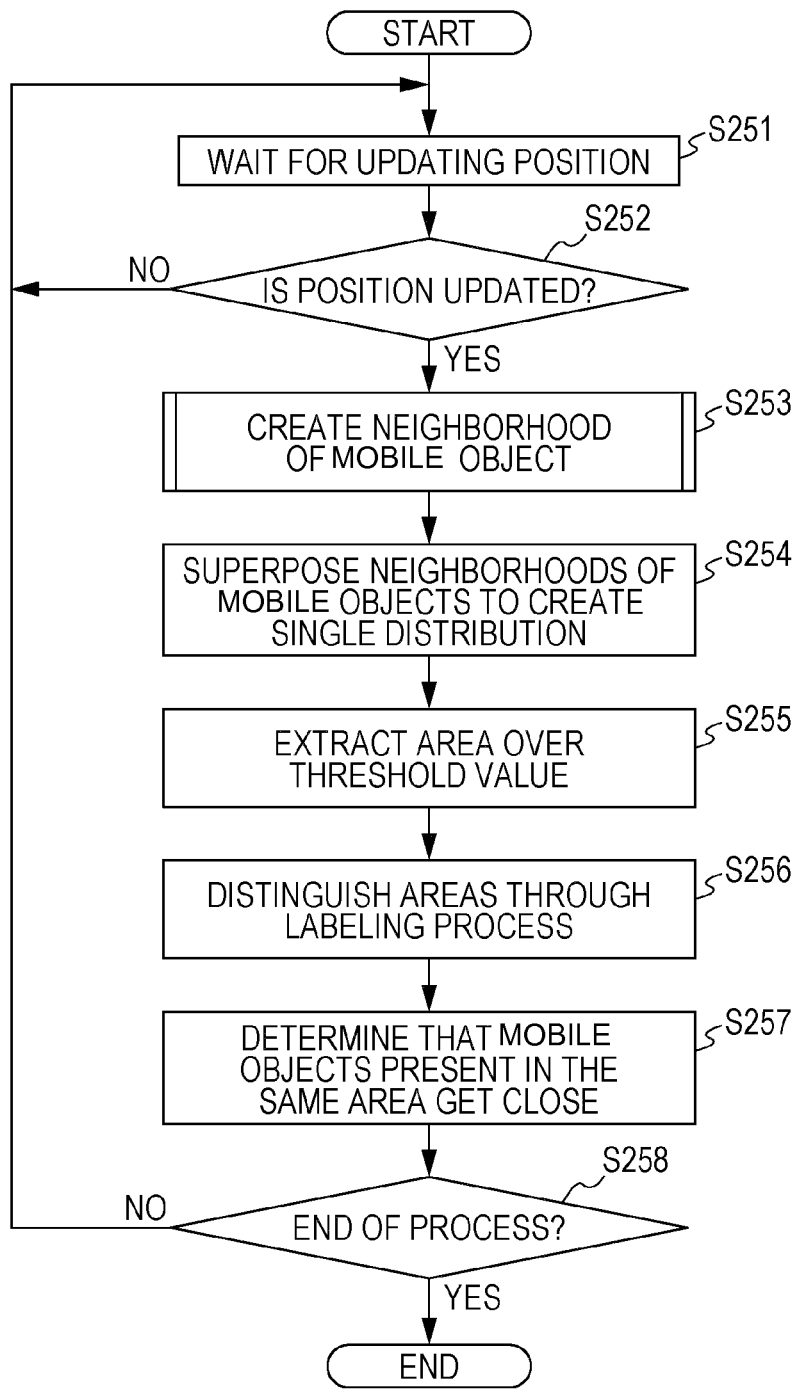
FIG. 30 illustrates a method of a closeness determining process in the second embodiment.

FIG. 30 illustrates a method of the closeness determining process in the second embodiment. As illustrated in FIG. 30, the neighborhood creating device 3-2 waits until the position acquiring unit 21 updates the position (S251). When the position is not updated (No in S252), the waiting state is maintained.

When the position is updated (YES in S252), the neighborhood creating device 3-2 creates the neighborhood area of a mobile object through the use of the same process as described in the first embodiment and the modification example (S253). The closeness determining unit 29 superposes the potential distributions of the created neighborhood areas of the mobile objects and creates a single distribution including the potential distributions 215 to 219, for example, as illustrated in FIG. 24 (S254). The closeness determining unit 29 extracts the areas of which the potential is higher than the threshold value in the created distribution (S255). That is, in the example illustrated in FIG. 24, the potential distribution 217 and the potential distribution 220 of which the potential is higher than the threshold value P0.

The closeness determining unit 29 distinguishes a continuous area from the areas, of which the potential is higher than the threshold value and which have been extracted in S255, through the use of a labeling process (S256). That is, in the example illustrated in FIG. 24, the potential distribution 217 and the potential distribution 220 are distinguished as different areas. The closeness determining unit 29 determines that the mobile objects present in the same area are close (S257). That is, in the example shown in FIG. 24, it is determined that the moving position present at the positional and the mobile object present at the position a2 are close to each other. In addition, it is determined that the moving position present at the position a3 and the mobile object present at the position a4 are close to each other. The neighborhood creating device 3 performs the process of S251 again, for example, when an end of process is not instructed from the portable terminal 5 (NO in S258), and ends the process flow when an end of process is instructed (YES in S258).

As described above, in the neighborhood creating system according to the second embodiment, the closeness determination is performed in an indoor space in which the traveling of a person (mobile object) is restricted by using the neighborhood area in consideration of the spatial structure. At this time, it is possible to detect the closeness of persons (mobile objects) based on the distance of an actual movement route instead of the linear distance. The actual movement route is a route along which a mobile object is predicted to actually move. The closeness determination based on the actual movement route may be performed by creating the potential distribution spreading to avoid walls and the like through which a mobile object is not able to move.

In the closeness determination according to the second embodiment, the potential distributions created for the plural mobile objects are superposed as described above, the portions of which the potential is higher than the threshold value are extracted therefrom, and continuous areas are distinguished through a labeling process. Therefore, it is possible to perform the closeness determination in consideration of the spatial structure around a mobile object without giving a feeling of wrongness at a high speed. At this time, when a mobile object is defined as a person carrying a portable terminal 5, persons present across a wall may not be determined to be close but only persons present in the same place not partitioned by the wall may be determined to be close. In addition to the simple closeness determination, the closeness in consideration of a route between mobile objects such as the route 228 can be also calculated numerically.

According to the second embodiment, the process of performing the closeness determination on all combinations of mobile objects is not used, and the process time only increases linearly even with an increase in the number of mobile objects. Therefore, with the increase in the number of mobile objects, the process time may be shorter than that in the case where the closeness determination is performed on the combinations.

Hereinafter, a neighborhood creating system according to a third embodiment will be described with reference to FIGS. 31 and 32. In this embodiment, the same elements and operations as in the first embodiment, the modification example, or the second embodiment will be referenced by the same reference numerals and detailed description thereof will not be repeated.

Figure 31:
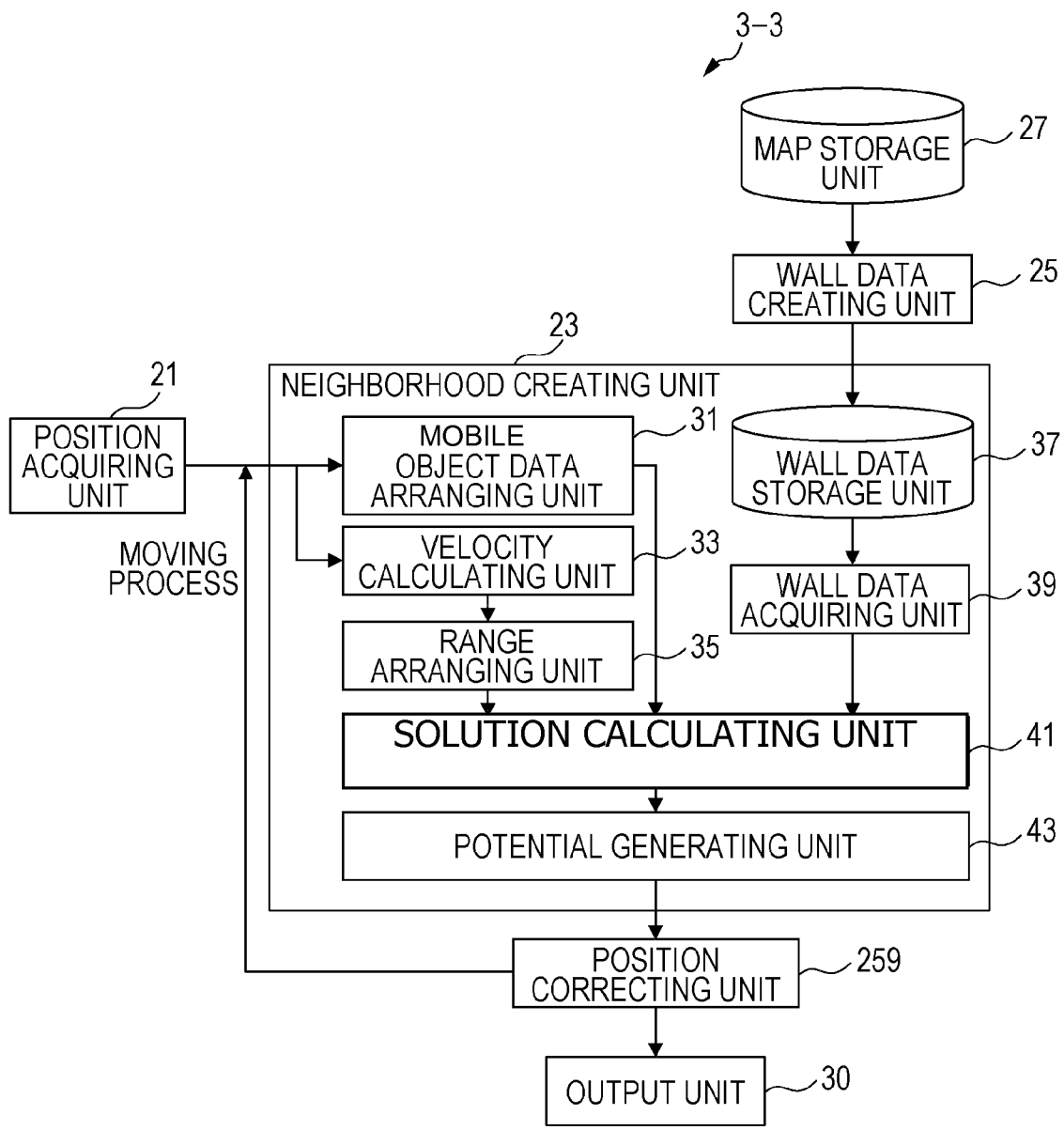
FIG. 31 illustrates functions of a neighborhood creating device according to a third embodiment.

FIG. 31 illustrates the functional configuration of a neighborhood creating device 3-3 according to a third embodiment. As illustrated in FIG. 31, the neighborhood creating device 3-3 includes a position acquiring unit 21, a neighborhood creating unit 23, a wall data creating unit 25, a map storage unit 27, a position correcting unit 259, and an output unit 30.

The neighborhood creating device 3-3 according to this embodiment includes the position correcting unit 259 in addition to the neighborhood creating device 3 according to the first embodiment and the modification example. The position correcting unit 259 corrects a mobile object position 166 based on the neighborhood area created by the neighborhood creating unit 23, the mobile object position 166 of the portable terminal 5 acquired by the position acquiring unit 21, and the wall data. When the mobile object position 166 is corrected, the position correcting unit 259 feeds back the corrected mobile object position 166 to the mobile object data arranging unit 31. The output unit 30 outputs the correction result of the position correcting unit 259.

Figure 32:
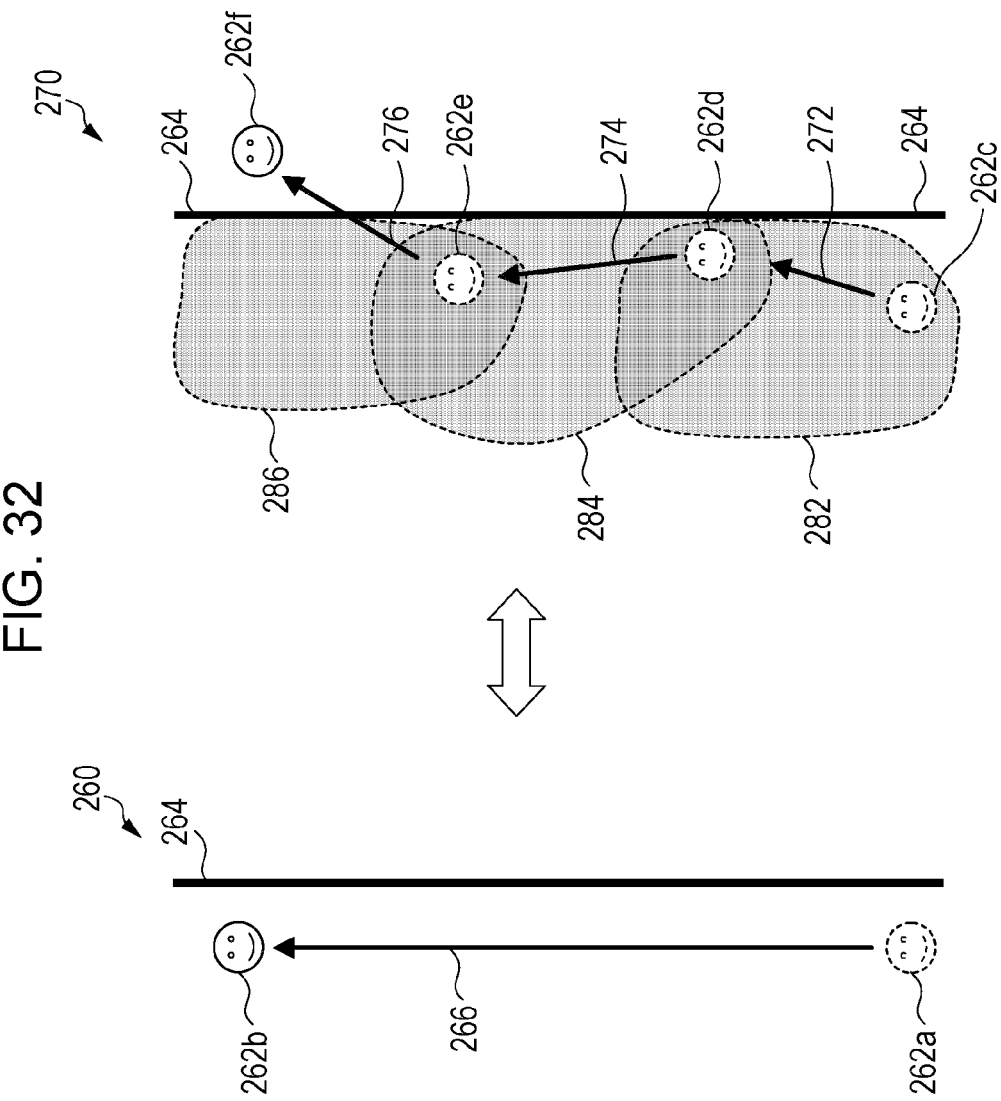
FIG. 32 illustrates correction of a position in the third embodiment.

FIG. 32 illustrates the position correction in the third embodiment. As illustrated by an actual track 260 of FIG. 32, a case where a mobile object 262 moves along a locus 266 extending from a mobile object position 262a to a mobile object position 262b along a wall 264 will be described. At this time, it is assumed that the neighborhood creating system 1 detects that the mobile object 262 moves along the calculated loci 272, 274, and 276 from a mobile object position 262c to a mobile object position 262e as the creation result 270. Then, neighborhood areas 282, 284, 286 are created with the movement of the mobile object 262.

Here, the neighborhood area 286 is created only on the left side of the wall 264 in FIG. 32. However, the calculated locus 276 based on the measurement of the position acquiring unit 21 goes over the wall 264. In this case, since the mobile object position 262f is not present inside the calculated neighborhood area 286, it is determined that the calculated locus 276 is erroneous and the mobile object position 166 is corrected such that the position of the mobile object 262 is located on the left side of the wall 264.

As described above, in the neighborhood creating system according to the third embodiment, there is a possibility of use as a filter for correcting a positioning error. For example, when it is detected that a mobile object enters a fixed area such as a room and the mobile object is located just before the outside of the wall of the room, a small positioning error serves as a cause of erroneous determination. In order to solve this problem, a process of determining the updated measured position to be an incorrect value and correcting the measured position to be within the neighborhood area when the present position is included in the neighborhood area using the neighborhood area calculated at the previous position can be considered. Since the neighborhood area goes over the wall, it is possible to suppress the erroneous determination on entering the room.

When the neighborhood area is analyzed as a latent movable range of a mobile object, it can be used as a position correcting filter when a measured coordinate intermits in a neighborhood area. That is, the intermitted measured position may be set to be inside the neighborhood area created prior to one step by the neighborhood creating system 1.

Hereinafter, a neighborhood creating system 1-2 according to a fourth embodiment will be described with reference to FIG. 33. In this embodiment, the same elements and operations as described in the first embodiment, the modification example, the second embodiment, or the third embodiment will be referenced by the same reference numerals and detailed description thereof will not be repeated.

Figure 33:
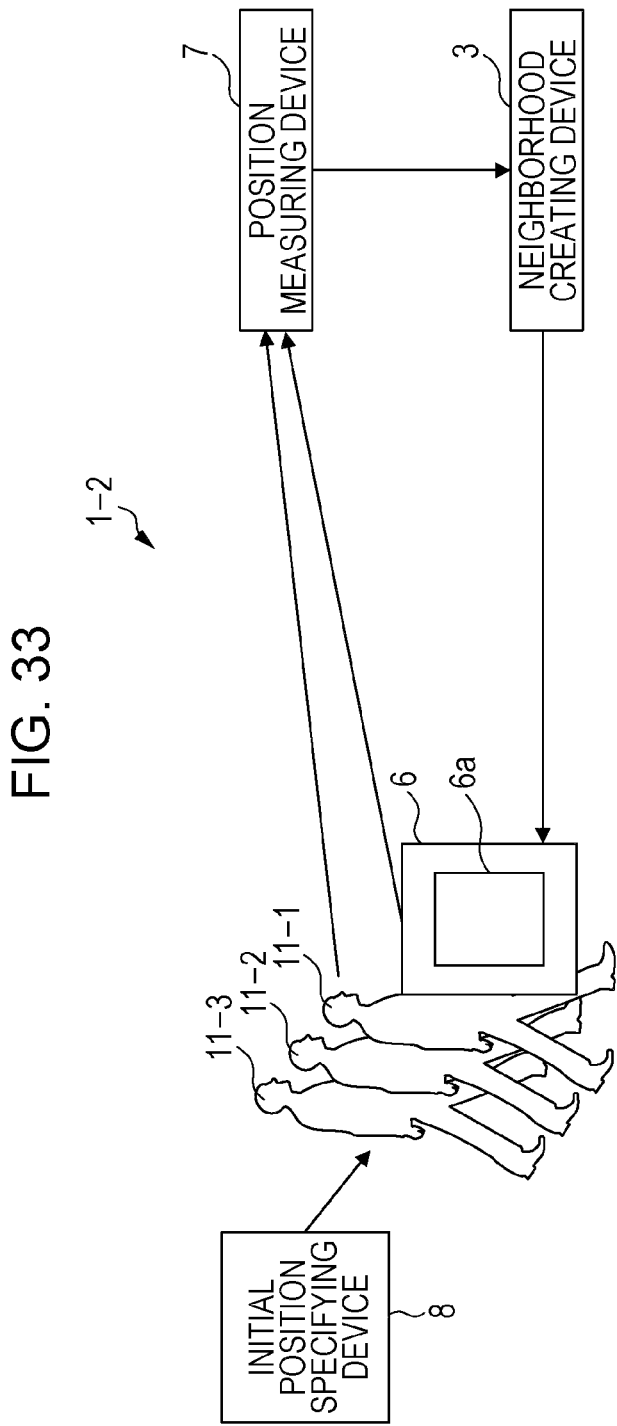
FIG. 33 illustrates the structure of a neighborhood creating system according to a fourth embodiment.

FIG. 33 illustrates the structure of the neighborhood creating system 1-2 according to the fourth embodiment. As illustrated in FIG. 33, the neighborhood creating system 1-2 includes a neighborhood creating device 3, one or more portable terminals 6-1, . . . , 6-n, and an initial position specifying device 8. The portable terminals 6-1, . . . , 6-n may be also collectively or representatively referred to as a portable terminal 6.

The portable terminals 6 are terminal devices such as portable information terminals or mobile phones which are carried, for example, by persons 11-1, 11-2, . . . and move therewith. In this embodiment, the portable terminal 6 is an example of the mobile object. The portable terminal 6 includes a display unit 6a having an input unit such as a touch panel, an initial position setting device, a wireless receiver that receives information from the neighborhood creating device 3 and the initial position setting device 8, a motion detecting sensor such as a gyro sensor or an acceleration sensor detecting the motion of the portable terminal 6, a control unit that controls the operation, and a storage unit. The portable terminal 6 enables to input information and enables to display information such as a map or a created neighborhood area.

The portable terminal 6 acquires its own initial position by communicating with the initial position setting device 8 through a wireless communication network. The portable terminal 6 transmits the set initial position and the information detected by the motion detecting sensor to a position estimating device 7 through a wireless network 15. The position estimating device 7 estimates the position of the portable terminal 6 based on the received information. The portable terminal 6 receives created neighborhood information from the neighborhood creating device 3 through a wireless network and presents the received neighborhood information. In this embodiment, the processes other than the self position detecting method may employ the same as described in the first embodiment, the modification example, the second embodiment, or the third embodiment.

As described above, in the neighborhood creating system 1-2 according to the fourth embodiment, it is possible to use a high-accuracy positioning technique into which an autonomous navigation using a gyro sensor or an acceleration sensor mounted on the portable terminal 6 is combined after acquiring the initial position and, for example, positioning accuracy of 1 m or less is expected. According to the neighborhood creating system 1-2, a position of a person can be practically measured with higher accuracy. Accordingly, since a motive for preparing maps including indoor room arrangement information in addition to outdoor information can be provided, it is possible to provide a finer service interlocking with situations of persons to a user.

Wall data 97 and wall data 153 are examples of the obstacle data, and the wall data acquiring unit 39 is an example of the obstacle data acquiring function. The mobile object data arranging unit 31 is an example of the mobile object data creating function and the range arranging unit 35 is an example of the range setting function.

The disclosure is not limited to the above-mentioned embodiments, but may have various configurations of embodiments without departing from the concept of the disclosure. For example, the first to fourth embodiments and the modification example may be combined within an allowable range. For example, in the first embodiment, the maximum range of S203 may be defined as an area having a shape other than a circle or an ellipse, such as an area based on the shape of the surrounding walls.

When the portable terminal 5 or the portable terminal 6 is provided with a self position estimating function, the self position may be notified directly to the neighborhood creating device 3 without using the position estimating device 7. By combining the autonomous navigation using gyro sensor or an acceleration sensor mounted on the portable terminal with the wireless LAN positioning, it is possible to enable higher-accuracy positioning. The notification of the process result from the neighborhood creating device 3 to the portable terminal 5 may be carried out using an electronic mail. The neighborhood creating system according to the first to fourth embodiments or the modification example may be applied to applications other than the closeness determination or the position correction. For example, the neighborhood creating system can be widely applied to applications such as reproduction of a sound field in virtual reality and a trigger area for providing services based on a position as an example using the route distance between points.

In the reproduction of a sound field in virtual reality, when a sound emitted from a sound source in an actual space is virtually reproduced, it can be thought that it is possible to reproduce the sound with a more realistic sensation by changing the sound volume transmitted from the sound source to a listener depending on the route distance between the sound source and the listener. At this time, it is preferable that the sound volume be changed to follow a slight variation in position of the listener. In consideration of this purpose, since it is desired to calculate the route distance from the sound source in continuous positions on a map instead of discrete spots, it is possible to use the neighborhood creating system according to the first to fourth embodiments and the modification example.

As another example, a global route of a robot may be efficiently planned using a potential. By calculating the optimal route in a state space through generalization, for example, it may be possible to create a track of a manipulator. In the neighborhood creating system according to the first to fourth embodiments and the modification example, it is possible to create a route or a track at a high speed.

The arrangement of the charge points and the sample points has a large influence on calculation accuracy. In general, a wide arrangement interval tends to cause a large calculation error. When the number of points is excessively large, the calculation load increases. A decrease in the number of points may be considered by densely arranging points in a narrow place (a place in which walls are densely present) and coarsely arranging points in a wide place.

Figure 34:
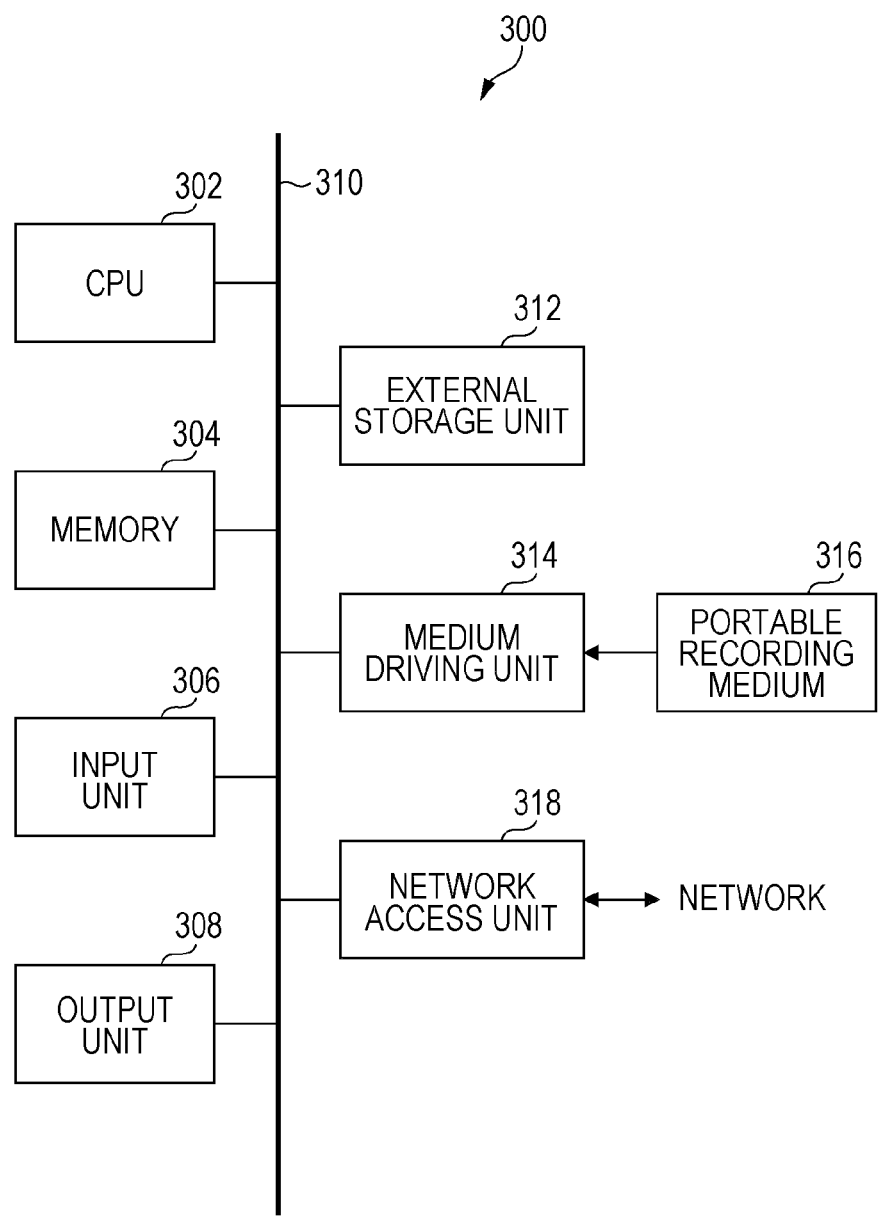
FIG. 34 illustrates the structure of a standard computer.

An example of a computer which is used in common to cause the computer to perform the operations of the neighborhood creating method according to the first to fourth embodiments and the modification example will be described below. FIG. 34 illustrates an example of a hardware configuration of a standard computer. In the computer 300 illustrated in FIG. 34, a central processing unit (CPU) 302, a memory 304, an input unit 306, an output unit 308, an external storage unit 312, a medium driving unit 314, and a network access unit are connected via a bus 310. The CPU may use one or more processors. Another embodiment may use one or more CPUs instead of the CPU.

The CPU 302 is an arithmetic processing unit that controls the entire operation of the computer 300. The memory 304 is a storage unit that stores a program controlling the operation of the computer 300 in advance or that is used as a work area as occasion calls when executing the program. The memory 304 may include, for example, a random access memory (RAM) and a read only memory (ROM).

The input unit 306 is a unit that acquires input of a variety of information from a user, which is correlated with the manipulation details thereof and that transmits the acquired input information to the CPU 302, when it is manipulated by the user of the computer and includes, for example, a keyboard and a mouse. The output unit 308 is a unit that outputs the process results of the computer 300 and includes a display device. For example, the display device displays a text or an image based on display data transmitted from the CPU 302.

The external storage unit 312 is a storage unit such as a hard disk and is a unit that stores various control programs which are executed by the CPU 302, acquired data, or the like. The medium driving unit 314 is a unit that writes and reads data to and from a portable recording medium 316. The CPU 302 may perform various control processes by reading a predetermined control program recorded on the portable recording medium 316 through the use of the medium driving unit 314 and executing the read control program. The portable recording medium 316 is, for example, a compact disc (CD)-ROM, a digital versatile disc (DVD), or a universal serial bus (USB) memory. The network access unit 318 is an interface unit that manages transmission of various data to and from the outside in a wired or wireless manner. The bus 310 is a communication path that connects the units to each other and that enables data exchange therebetween.

The program causing a computer to perform the neighborhood creating method according to the first to fourth embodiments and the modification example is stored, for example, in the external storage unit 312. The CPU 302 reads the program from the external storage unit 312 and causes the computer 300 to perform the neighborhood creating process. At this time, a control program for causing the CPU 302 to perform the neighborhood creating process is first prepared and stored in the external storage unit 312. A predetermined instruction is input to the CPU 302 through the input unit 306 and this control program is read and executed from the external storage unit 312. This control program may be stored in the portable recording medium 316.

A position acquiring unit 21, a wall data creating unit 25, mobile object data arranging unit 31, velocity calculating unit 33, range arranging unit 35, a wall data acquiring unit 39, solution calculating unit 41, potential generating unit 43, closeness determining unit 29, and a position correcting unit 259 may be configured to be programs. These programs may be executed by one or more processors.

In the first to fourth embodiments and the modification examples, the position acquiring unit 21, the wall data creating unit 25, the closeness determining unit 29, the mobile object data arranging unit 31, the mobile object velocity calculating unit 33, the range arranging unit 35, the wall data acquiring unit 39, the solution calculating unit 41, the potential generating unit 43, the position correcting unit 259, and the output unit 30 may employ a structure using at least one hardware configuration of (1) to (4) described below. The units may be shared through a multi-tasking process of the CPU. One or more of the position acquiring unit 21, the wall data creating unit 25, the closeness determining unit 29, the mobile object data arranging unit 31, the mobile object velocity calculating unit 33, the range arranging unit 35, the wall data acquiring unit 39, the solution calculating unit 41, the potential generating unit 43, the position correcting unit 259, and the output unit 30 may be constructed, for example, using a CPU and a memory.

(1) A configuration in which one or more CPUs perform a predetermined process by loading a program onto a memory 304 from an external storage unit 312, a variable recording medium 316, or the like and executing the loaded program;

(2) A configuration including a field programmable gate array (FPGA);

(3) A configuration including an application specific integrated circuit (ASIC); and (4) A configuration including a circuit.

Additional Notes for the Embodiments

Note 1. A neighborhood creating device, comprising: one or more processors configured to acquire position information representing a position of a mobile object, create mobile object data representing a condition associated with a movable range of the mobile object based on the position information, acquire obstacle data representing a condition associated with a place through which the mobile object is not able to move, and create neighborhood information satisfying both conditions represented by the mobile object data and the obstacle data and continuously representing a movable range of the mobile object around the mobile object; and a memory coupled to the one or more processors.

Note 2. The neighborhood creating device according to claim 1, wherein the obstacle data includes a condition associated with a place through which the mobile object is not able to move.

Note 3. The neighborhood creating device according to claim 2, wherein the one or more processor is further configured to create simultaneous equations based on the mobile object data and the obstacle data and that calculates solutions of the simultaneous equations, and to solve the simultaneous equations through the use of a charge simulation method using Laplace equations as the simultaneous equations.

Note 4. The neighborhood creating device according to claim 3, wherein the one or more processor is further configured to create a sample point used to set a potential associated with the movable range of the mobile object and a point as a charge point at which the potential is generated as the mobile object data, wherein the one or more processor is further configured to acquire a sample point used to set a potential associated with a place through which the mobile object is not able to move and a charge point at which the potential is generated as the obstacle data, wherein the one or more processor is further configured to set a condition such that the potential of the sample point in the mobile object data is higher than the potential of the sample point in the obstacle data and to calculate coefficients to be multiplied by the potentials as the solutions of the simultaneous equations such that the potentials of the sample points satisfy the condition when the potentials generated at the charge points are superposed, and wherein the one or more processor is further configured to calculate the potentials as the neighborhood information based on the solutions.

Note 5. The neighborhood creating device according to claim 3, the one or more processor is further configured to determine a maximum range in which the neighborhood information is calculated based on the position information and to set range data representing a sample point used to set a potential associated with the maximum range and a point as a charge point at which the potential is generated, wherein the one or more processor is further configured to set a condition such that the potential of the sample point in the mobile object data is higher than the potentials of the sample point in the range data and the sample point in the obstacle data, and to solve the simultaneous equations through the use of a charge simulation method.

Note 6. The neighborhood creating device according to claim 5, the one or more processor is further configured to calculate a speed and a moving direction of the mobile object based on the position information, wherein the one or more processor is further configured to set the maximum range based on the speed and the moving direction.

Note 7. The neighborhood creating device according to claim 1, the one or more processor is further configured to determine whether a plurality of the mobile objects get close, wherein the one or more processor is further configured to acquire positions of the plurality of mobile objects, wherein the one or more processor is further configured to create a two-dimensional distribution of the neighborhood information by performing processes on the plurality of mobile objects, and wherein the one or more processor is further configured to determine whether the plurality of mobile objects get close based on the superposition of the two-dimensional distributions of the neighborhood information of the plurality of mobile objects.

Note 8. The neighborhood creating device according to claim 7, wherein the one or more processor is further configured to set a threshold value of the neighborhood information, to create a two-dimensional distribution of the neighborhood information having a value equal to or more than the threshold value, and to determine whether the mobile objects in the continuous two-dimensional distributions of the neighborhood information get close.

Note 9. The neighborhood creating device according to claim 1, the one or more processor is further configured to correct the position information of the mobile object by creating the neighborhood information at different times.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A neighborhood creating device, comprising:
a memory; and
one or more processors that execute a procedure in the memory, the procedure including
a position acquiring process that acquires position information representing a position of a mobile object;
a data creating process that creates mobile object data representing a condition associated with a movable range of the mobile object based on the position information;
a data acquiring process that acquires obstacle data representing a condition associated with a place through which the mobile object is not able to move; and
an information creating process that creates neighborhood information satisfying both conditions represented by the mobile object data and the obstacle data and continuously representing the movable range of the mobile object around the mobile object; and
a solution calculating and solving process that creates simultaneous equations based on the mobile object data and the obstacle data and solves the simultaneous equations through the use of a charge simulation method.

2. The neighborhood creating device according to claim 1, wherein Laplace equations are used as the simultaneous equations.

3. The neighborhood creating device according to claim 2, wherein the data creating process creates a sample point used to set a potential associated with the movable range of the mobile object and a point as a charge point at which the potential is generated as the mobile object data,
wherein the data acquiring process acquires a sample point used to set a potential associated with a place through which the mobile object is not able to move and a charge point at which the potential is generated as the obstacle data,
wherein the solution calculating process sets a condition such that the potential of the sample point in the mobile object data is higher than the potential of the sample point in the obstacle data and calculates coefficients to be multiplied by the potentials as the solutions of the simultaneous equations such that the potentials of the sample points satisfy the condition when the potentials generated at the charge points are superposed, and
wherein the information creating process calculates the potentials as the neighborhood information based on the solutions.

4. The neighborhood creating device according to claim 2, the procedure further including:
a range setting process that determines a maximum range in which the neighborhood information is calculated based on the position information and that sets range data representing a sample point used to set a potential associated with the maximum range and a point as a charge point at which the potential is generated, wherein the solution calculating process sets a condition such that the potential of the sample point in the mobile object data is higher than the potentials of the sample point in the range data and the sample point in the obstacle data, and solves the simultaneous equations through the use of a charge simulation method.

5. The neighborhood creating device according to claim 4, the procedure further including:

a velocity calculating process that calculates a speed and a moving direction of the mobile object based on the position information, wherein the range setting process sets the maximum range based on the speed and the moving direction.

6. The neighborhood creating device according to claim 1, the procedure further including:

a closeness determining process that determines whether a plurality of the mobile objects get close, wherein the position acquiring process acquires positions of the plurality of mobile objects, wherein the data creating process and the information creating process create a two-dimensional distribution of the neighborhood information by performing processes on the plurality of mobile objects, and wherein the closeness determining process determines whether the plurality of mobile objects get close based on the superposition of the two-dimensional distributions of the neighborhood information of the plurality of mobile objects.

7. The neighborhood creating device according to claim 6, wherein the closeness determining process sets a threshold value of the neighborhood information, creates a two-dimensional distribution of the neighborhood information having a value equal to or more than the threshold value, and determines whether the mobile objects in the continuous two-dimensional distributions of the neighborhood information get close.

8. The neighborhood creating device according to claim 1, the procedure further including:

a position correcting process that corrects the position information of the mobile object by creating the neighborhood information at different times.

9. A neighborhood creating method performed by a processor, the method comprising:

acquiring position information representing a position of a mobile object;

creating mobile object data representing a condition associated with a movable range of the mobile object based on the position information;

acquiring obstacle data representing a condition associated with a place through which the mobile object is not able to move;

creating neighborhood information satisfying both conditions represented by the mobile object data and the obstacle data and continuously representing the movable range of the mobile object around the mobile object;

creating simultaneous equations based on the mobile object data and the obstacle data; and solving the simultaneous equations through the use of a charge simulation method.

10. The neighborhood creating method according to claim 9, wherein the simultaneous equations are Laplace equations.

11. The neighborhood creating method according to claim 10, wherein a sample point used to set a potential associated with the movable range of the mobile object and a point as a charge point at which the potential is generated are created as the mobile object data when creating the mobile object data, wherein information on a sample point used to set a potential associated with a place through which the mobile object is not able to move and a charge point corresponding to a point at which the potential is generated are acquired as the obstacle data when acquiring the obstacle data, wherein a condition is set such that the potential of the sample point in the mobile object data is higher than the potential of the sample point in the obstacle data and coefficients to be multiplied by the potentials are calculated as the solutions of the simultaneous equations such that the potentials of the sample points satisfy the condition when the potentials generated at the charge points are superposed when calculating the solutions, and wherein the potentials are calculated as the neighborhood information based on the solutions when creating the neighborhood information.

12. The neighborhood creating method according to claim 10, further comprising:

determining a maximum range in which the neighborhood information is calculated based on the position information and setting range data representing a sample point used to set a potential associated with the maximum range and a point as a charge point at which the potential is generated, wherein a condition is set such that the potential of the sample point in the mobile object data is higher than the potentials of the sample point in the range data and the sample point in the obstacle data, and the simultaneous equations are solved through the use of a charge simulation method when calculating the solutions.

13. A non-transitory computer-readable recording medium having stored therein a program for causing a computer to execute a neighborhood creating process, the process comprising:

acquiring position information representing a position of a mobile object;

creating mobile object data representing a condition associated with a movable range of the mobile object based on the position information;

acquiring obstacle data representing a condition associated with a place through which the mobile object is not able to move;

creating neighborhood information satisfying both conditions represented by the mobile object data and the obstacle data and continuously representing the movable range of the mobile object around the mobile object;

creating simultaneous equations based on the mobile object data and the obstacle data; and solving the simultaneous equations through the use of a charge simulation method.

14. An apparatus, comprising:

a memory; and one or more processors coupled to the memory and configured to:

acquire position information representing a position of a mobile object, create mobile object data representing a condition associated with a movable range of the mobile object based on the position information, acquire obstacle data representing a condition associated with a place through which the mobile object is not able to move, create neighborhood information satisfying both conditions represented by the mobile object data and the obstacle data and continuously representing the movable range of the mobile object around the mobile object, and create simultaneous equations based on the mobile object data and the obstacle data and solve the simultaneous equations through the use of a charge simulation method.

\* \* \* \* \*

UNITED STATES PATENT AND TRADEMARK OFFICE
CERTIFICATE OF CORRECTION

PATENT NO. : 8,886,458 B2  
APPLICATION NO. : 13/779799  
DATED : November 11, 2014  
INVENTOR(S) : Hisatoshi Yamaoka Page 1 of 1

It is certified that error appears in the above-identified patent and that said Letters Patent is hereby corrected as shown below:

In the Claims

Column 24, Line 27, Claim 1, after "move;" delete "and".

Signed and Sealed this  
Twenty-fourth Day of February, 2015

Michelle K. Lee  
*Deputy Director of the United States Patent and Trademark Office*